US012332011B1

(12) United States Patent
King et al.

(10) Patent No.: US 12,332,011 B1
(45) Date of Patent: Jun. 17, 2025

(54) INERT LAUNCH CONTROL SIMULATOR

(71) Applicants: Christopher D. King, Spotsylvania, VA (US); Taylor Richard Courtney, King George, VA (US); Amanda Nolan Dearhart, King George, VA (US); Robert William Love, III, King George, VA (US); Timothy Roy Collins, King George, VA (US); Douglas Gerald Gross, Fredericksburg, VA (US); Jeremiah W. Mosse, Bedford, VA (US)

(72) Inventors: Christopher D. King, Spotsylvania, VA (US); Taylor Richard Courtney, King George, VA (US); Amanda Nolan Dearhart, King George, VA (US); Robert William Love, III, King George, VA (US); Timothy Roy Collins, King George, VA (US); Douglas Gerald Gross, Fredericksburg, VA (US); Jeremiah W. Mosse, Bedford, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 7 days.

(21) Appl. No.: 18/419,017

(22) Filed: Jan. 22, 2024

(51) Int. Cl.
*F41A 33/00* (2006.01)
*F41F 3/04* (2006.01)
*G05F 1/46* (2006.01)

(52) U.S. Cl.
CPC ................ *F41A 33/00* (2013.01); *F41F 3/04* (2013.01); *G05F 1/462* (2013.01)

(58) Field of Classification Search
CPC .............. F41A 33/00; F41F 3/04; G05F 1/462
USPC ............................................................ 89/1.8
See application file for complete search history.

(56) References Cited

U.S. PATENT DOCUMENTS

| | | | | |
|---|---|---|---|---|
| 5,742,609 A * | 4/1998 | Kondrak | .................. F41F 3/04 | 370/465 |
| 2012/0024136 A1* | 2/2012 | McCants, Jr. | ............ B64D 1/04 | 89/1.819 |

* cited by examiner

*Primary Examiner* — Samir Abdosh
(74) *Attorney, Agent, or Firm* — Gergard W. Thielman

(57) ABSTRACT

An electronic device (210) is provided for simulating launch activation of a missile. The missile has a rocket motor and a payload. The device connects to a launch controller (380) for the motor and an ordnance controller (390). The device includes a direct current (DC) power supply (220); a circuit board (440); a payload jack (340); and data jacks (350, 360). The circuit board (440) includes a voltage regulator (570, 580), a thrust vector control (TVC) circuit (510), input, output and power plugs (550, 560, 590). The power plug (590) connects to the power supply (220). The payload jack (340) connects the output plug (560) to the ordnance controller (390) and to the TVC circuit (510). The output data jack (350) connects the circuit board (440) to the ordnance controller (390). The input data jack (360) connects the circuit board (440) to the launch controller (380). The circuit board (440) receives a signal from the launch controller (380) to which said ordnance controller (390) responds.

6 Claims, 18 Drawing Sheets

1700

Table I. ICV-Lite LSEQ Umbilical Cable Signal Characteristics for VOTS Payload MK 46

| Connector Pins | Signal Function | Signal Levels J102 (MK 46) 1710 |
|---|---|---|
| 26 | Missile Round ID Bit 0 | +22 to +30 VDC |
| 25 | Missile Round ID Bit 1 | 0 VDC |
| 24 | Missile Round ID Bit 2 | 0 VDC |
| 38 | Missile Round ID Bit 3 | 0 VDC |
| 37 | Missile Round ID Bit 4 | +22 to +30 VDC |
| 36 | Missile Round ID Bit 5 | +22 to +30 VDC |
| 35 | Missile Round ID Bit 6 | 0 VDC |
| 34 | Missile Round ID Bit 7 | 0 VDC |
| 46 | Missile Round ID Bit 8 | 0 VDC |
| 45 | Missile Round ID Bit 9 | 0 VDC |
| 44 | Missile Round ID Bit 10 | 0 VDC |
| 43 | Missile Round ID Bit 11 | +22 to +30 VDC |
| 56 | Missile Round ID Bit 12 | +22 to +30 VDC |
| 55 | Missile Round ID Bit 13 | +22 to +30 VDC |
| 54 | Missile Round ID Bit 14 | +22 to +30 VDC |
| 61 | Missile Round ID Bit 15 | +22 to +30 VDC |
| 27 | Missile Round ID Supply | +22 to +30 VDC |

Table II. ICV-Lite LSEQ Umbilical Cable Signal Characteristics for VOTS Payload MK 54

| Connector Pins | Signal Function | Signal Levels J102 (MK 54) 1720 |
|---|---|---|
| 26 | Missile Round ID Bit 0 | +22 to +30 VDC |
| 25 | Missile Round ID Bit 1 | 0 VDC |
| 24 | Missile Round ID Bit 2 | 0 VDC |
| 38 | Missile Round ID Bit 3 | 0 VDC |
| 37 | Missile Round ID Bit 4 | +22 to +30 VDC |
| 36 | Missile Round ID Bit 5 | 0 VDC |
| 35 | Missile Round ID Bit 6 | +22 to +30 VDC |
| 34 | Missile Round ID Bit 7 | 0 VDC |
| 46 | Missile Round ID Bit 8 | 0 VDC |
| 45 | Missile Round ID Bit 9 | 0 VDC |
| 44 | Missile Round ID Bit 10 | 0 VDC |
| 43 | Missile Round ID Bit 11 | +22 to +30 VDC |
| 56 | Missile Round ID Bit 12 | +22 to +30 VDC |
| 55 | Missile Round ID Bit 13 | +22 to +30 VDC |
| 54 | Missile Round ID Bit 14 | +22 to +30 VDC |
| 61 | Missile Round ID Bit 15 | +22 to +30 VDC |
| 27 | Missile Round ID Supply | +22 to +30 VDC |

FIG. 17

INERT LAUNCH CONTROL SIMULATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to hardware for inert simulation of launch control equipment. In particular, the invention relates to launch test safety for the Mark 41 Vertical Launch System (VLS) as for shipboard missile defense.

The Mark 41 VLS is deployed on U.S. naval destroyers and cruisers, as well as combat vessels from allied navies for managing launch weapons on board. FIG. 1 shows a perspective view 100 of an Aegis destroyer (DDG-51 Arleigh Burke class) 110 from bow 120 to stern 130 above water. This destroyer has a length of approximately 155 m and a weight of $9\cdot10^6$ g. A compass rose 140 identifies ship orientation—forward X, port Y and heave Z. (Rotations about these respective axes are roll, pitch and yaw.)

The destroyer 110 includes two VLS sets: fore 150 with 32 canister arrays and aft 160 with 64 canister arrays below decks. The canisters 170 comprise modular frames 175 into which missiles are loaded. Such missiles include RUM-139 anti-submarine rocket (ASROC) 180, anti-air RIM-156A Standard Missile-2 185 and anti-surface BGM-109 Tomahawk 190. Such missiles are launched by firing their individual rocket motors to boost them away from the destroyer 110 and deploy their separate payloads.

SUMMARY

Conventional ordnance simulators yield disadvantages addressed by various exemplary embodiments of the present invention. In particular, various exemplary embodiments provide an electronic device (210) for simulating launch activation of a missile. The missile has a rocket motor and a payload. The device connects to a launch controller (380) for the missile and an ordnance controller (390). The device includes a direct current (DC) power supply (220); a circuit board (440); a payload jack (340); and an input data and power jack (350).

Various embodiments further include the circuit board (440) having a voltage regulator (570, 580), a thrust vector control (TVC) circuit (510), an input plug (550), an output plug (560) and a power plug (590). The power plug (590) connects (710) to the power supply (220). The payload jack (340) connects the input and output plugs (550, 560) to the ordnance controller (390) and to the circuit board (440). The output data jack (350) connects the circuit board (440) to the ordnance controller (390). The input data jack (360) connects the circuit board (440) to the launch controller (380). The circuit board (440) receives a signal from the launch controller (380) to which said ordnance controller (390) responds.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 17 is a tabular view of signal characteristics of select torpedo payloads.

DETAILED DESCRIPTION

Figure 1:
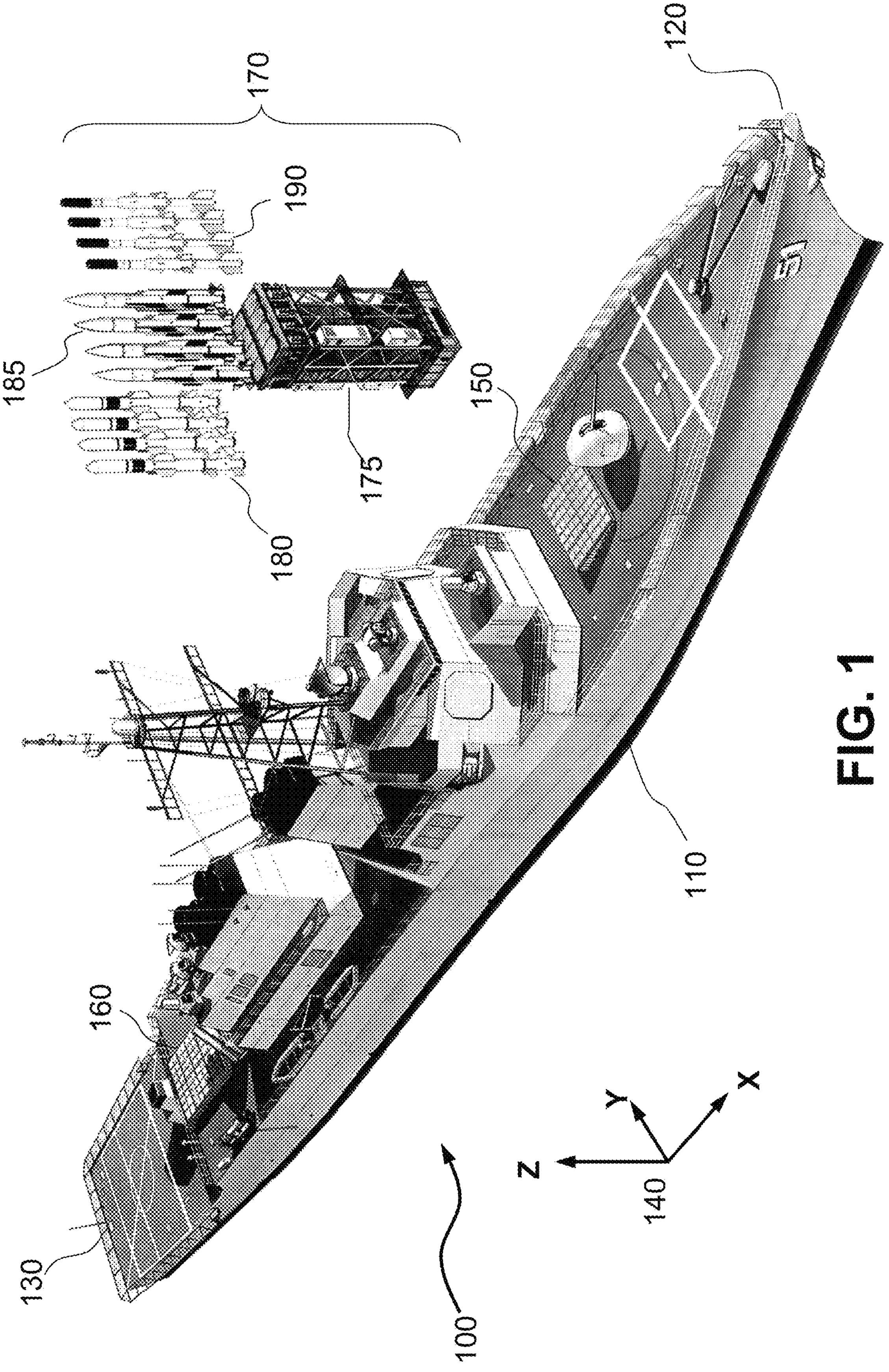
FIG. 1 RELATED ART
FIG. 1 is a perspective view of a naval destroyer.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Exemplary embodiments provide techniques for gathering objective quality evidence providing full end-to-end VLS validation. Validation includes, but not limited to; continuity of system cabling to rockets, expected communication between external systems and rockets, and proper calculation of ballistic data. This functionality enables enablement of safely verifying or calibrating new launching systems, similar to citing in a rifle.

The technique includes breaking out signals sent from the launching system, payload simulator, and inert VLS microprocessor then manipulating them for hardware simulation. Manipulations of these signals enable for injecting simulated loads, running signal processor calculations, rectifying signals, transferring data, manual setting of missile identification, and appropriate timing of signals to achieve the desired response. Voltage signals generated advantage pre-existing external system responses, putting the system in a safe condition for utilizing this simulator amongst other live ordnances, without the risk of inadvertent firings. Enablements include circuitry within in an enclosure suitable for the necessary environment, such as onboard a U.S. Navy combat vessel.

In accordance with a presently preferred embodiment of the ICV-Lite, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

The disclosure generally employs quantity units with the following abbreviations: length in meters (m) or inches ("), mass in grams (g), time in seconds (s), angles in degrees (°), force in newtons (N), temperature in kelvins (K) or degrees fahrenheit (° F.), energy in joules (J), electric potential (direct current) in volts ($V_{DC}$), resistance in ohms (Ω), capacitance in microfarads (μf) and frequencies in hertz (Hz). Supplemental measures can be derived from these, such as density in grams-per-cubic-centimeters ($g/cm^3$), moment of inertia in gram-square-centimeters ($kg\text{-}m^2$) and the like.

The only reliable method to validate rocket-launching systems comprises live firings of the missile. Simulators developed over the years have been intended for a laboratory-based environment and do not provide the necessary simulation for full shipboard system validation. Exemplary embodiments enable verification and calibration of VLS launching protocols without the costly expenditure of a missile. Stimulation from external systems, normally engaging with VLS, required for proper use of exemplary embodiments described herein as a hardware simulator device. Connections for simulation of the external system require proximate physical presence of that device. For the case observed herein, that presence is onboard a naval warship. Exemplary embodiments also leverage other test sets, payload simulators and inert VLS microprocessors, to provide proper stimulation of the hardware simulator device.

Conventional techniques for ordnance launching simulation have been demonstrated as insufficient for the needs of end-to-end ordnance verification. To achieve worthwhile results, this level of validation requires facilitating communication to appropriate sub-systems and direct connection to the desired launching system in a realistic environment. Conventional simulators fall short of these requirements by rendering themselves unable to access the necessary data and ill-designed for the requisite testing environment for end-to-end validation.

The exemplary Inert Checkout Vertical (ICV) Launch ASROC (VLA) Lite (ICV-Lite) facilitates the appropriate input/output operations for gathering real world data. The ICV-Lite by design performs these functions while containing the necessary components in a lightweight, ruggedized enclosure for end-to-end validation of this nature.

Section 1—Physical Design: Exemplary devices, including as detailed herein, designed for ordnance launching simulation must connect to the launching system. These launching systems exist in a number of environments, each posing their own set of conditions. Such conditions require simulators entering such environments to possess a number of physical qualities ensuring their durability and consistency in operation.

At a minimum, such simulators must possess certain qualities for size, weight, durability, and portability. Size should be of reasonable proportion for the average individual to pick up and carry to and from the launching system. For the present embodiment of this invention, the enclosure dimensions are 25.5"×20.9"×10.8". Weight for such an exemplary device, as described, must not exceed the amount for the average individual to carry one device, by oneself, without assistance. Exemplary embodiments follow guidance outlined for a specific purpose within the U.S. Navy and weighs about 51 lbs.

Durability of materials used, both making up the enclosure and individual components contained within, must enable for repeated use providing consistent results. Exemplary embodiments described herein contain shock absorbing components to minimize effects from transport to and from launcher systems. Individual components, including those located on the outer enclosure for manual interaction, must provide for repeated cyclical use across a broad temperature range. Exemplary embodiments, by guidance of the U.S. Navy, operate within a temperature range from 32° F. to 122° F.

Portability takes into account size and weight requirements outlined previously and adds the requirement for handles enabling the realization of an individual to actually carry such a device by themselves. As an example, the exemplary embodiments include handles, relative to the center of gravity for the enclosure, on either side. This is not in a limiting sense, other design options may include a handle, strap, or other ergonomic carrying supports. Visual indication includes employment of at least one light emitting diode (LED).

Such an enclosure need not be specialized, as the market provides many qualifying enclosures. To fulfill these requirements, the presently preferred embodiments of the present invention utilizes a predesigned enclosure from Zero bCases identified on their website as "ZeRAK—Aluminum 19" Rackmount, Double Entry" (see https://catalog.zerocases.com/category/ases-zerak-aluminum-19-rackmount-double-ended-case). The physical configuration of individual components realizing exemplary embodiments are visualized with some illustrations.

Figure 2:
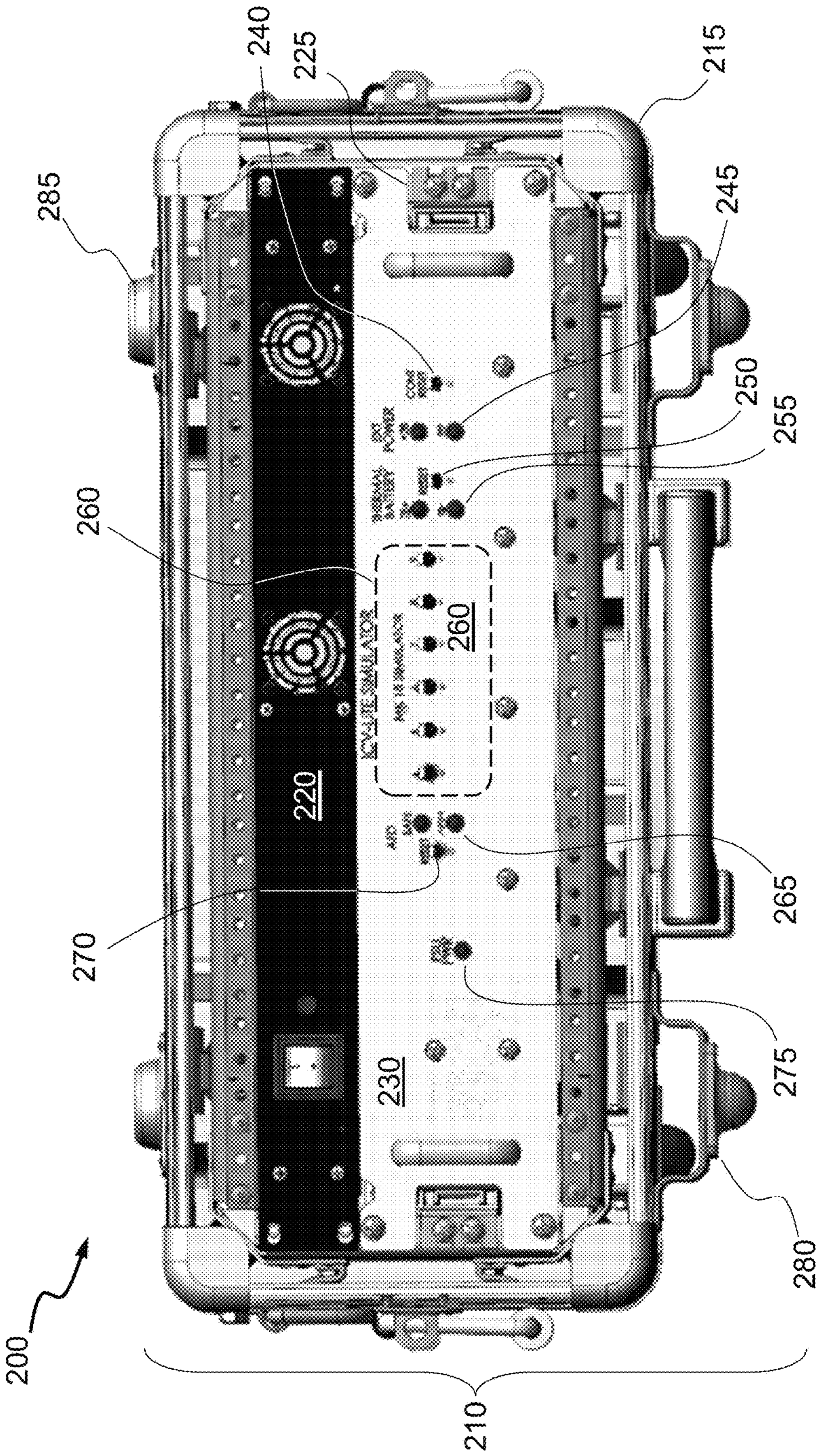
FIG. 2 is an elevation front view of a simulator.

FIG. 2 shows an elevation front view 200 of an exemplary ICV-Lite device 210 as the test simulator. This shows the rack mount, double entry, shock protected, outer housing enclosure 215 containing the components operating the ICV-Lite 210, such as the ICV-lite 210. A dual channel power supply 220 fastens itself to the upper rack. This power supply 220 receives $120V_{AC}$ input power and provides $\pm 28V_{DC}$ outputs with a 25 A maximum current output to power the components enabling the ICV-Lite 210. A sliding electronic shelf 225 fastens to the bottom of the enclosure 215 and contains the components enabling the ICV-Lite 210. The front panel 230 mounts to the enclosure 215 and provides a means for monitoring system status via LEDs and inputting settings via switches.

A continuity reset switch 240 resets an ordnance microcontroller to continuity relay between operations. External power indicator LEDs 245 provide visual representation of when the launching system provides power to the ICV-Lite 210. A thermal battery (TB) reset switch 250 provides power reset. Thermal battery indicator LEDs 255 enable visual verification that the ICV-Lite 210 applies supplemental power to the ordnance microcontroller at the appropriate time. Five weapon identification switches 260 are present in series on the front panel 230. These switches 260 enable the operator of the ICV-Lite 210 to direct power from the launching system to provide an octal code that specifies the type of ordnance simulated. In this instance, an individual switch 260 switches "up" provides power and operates as a "1" coded bit, and whereas set to "down" the bit connects to an electrical ground and operates as a "0" coded bit.

Safe and Arm indicator LEDs 265 indicate whether the simulator is in an "armed" or "safe" state based on an arming-firing device (AFD) response. The arm/safe reset switch 270 offers a way to reset the arm/reset components to their initial conditions before operation. Operators verify power application to components realizing ICV-Lite 210 with the power supply unit (PSU) LED 275, which serves to verify continuous power application to components throughout use of ICV-Lite 210 with power applied. A set of lower pads 280 supports enclosure 215 on a platform, with another set of upper buttons 285 are disposed opposite the pads 280.

Figure 3:
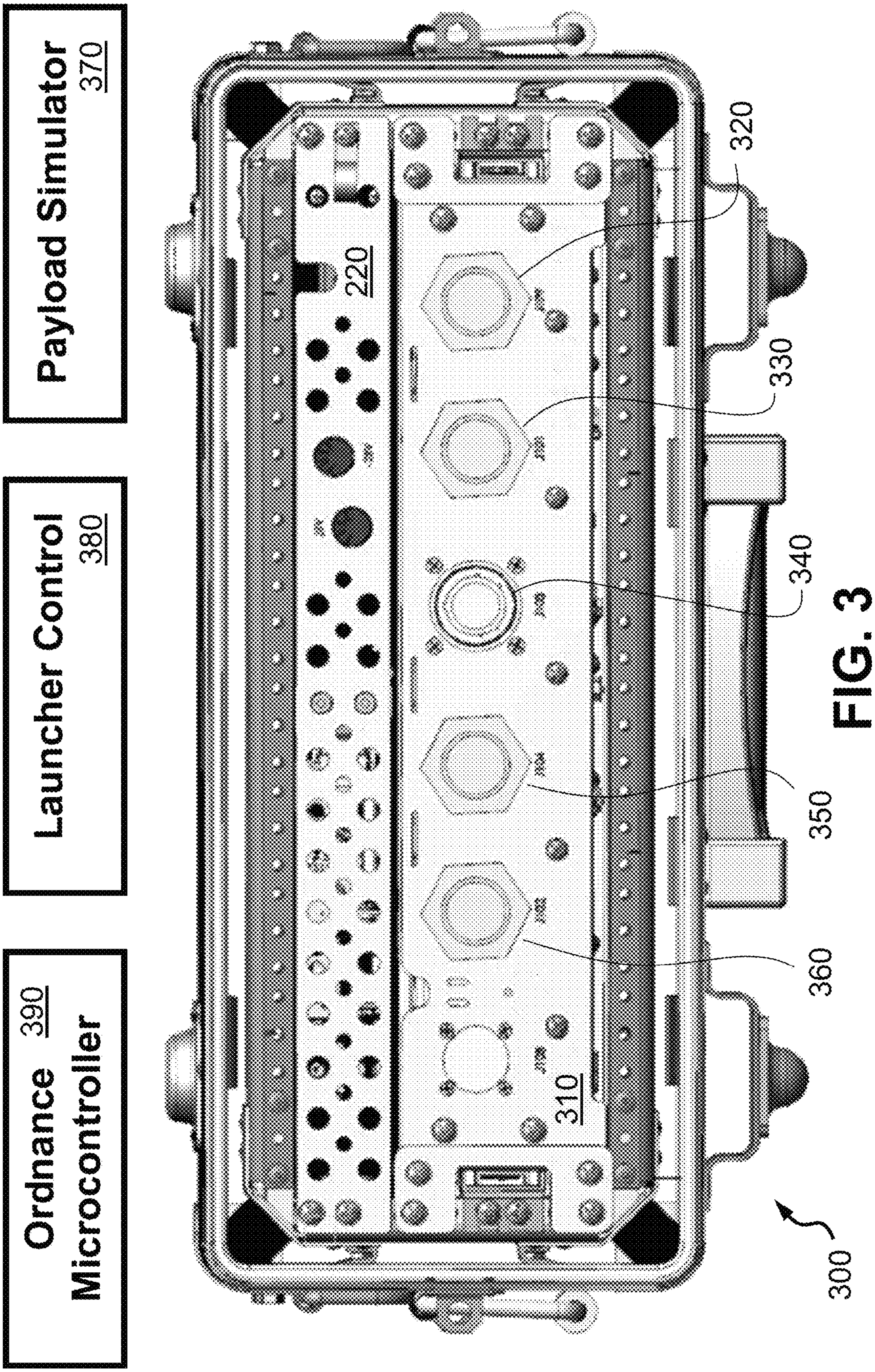
FIG. 3 is an elevation rear view of the simulator associated with external systems.

FIG. 3 shows an orthographic rear view 300 of the ICV-Lite 210. A rear panel 310 mounts to the enclosure 215 and provides mounts for receiving connectors (e.g., jacks): input payload 320, output payload 330, payload hardware simulation 340, output data transfer 350 and input data transfer 360 to ICV-Lite 210. The payload referenced for jack 340 includes thrust vector control (TVC), thrust cutoff (TCO) and arm/fire device (AFD) components. These connectors enable the delivery of various signals from external stimulation sources necessary for the operation of the ICV-Lite 210. These external sources include a payload simulator 370, a launcher control system (LCS) 380 and an external ordnance microcontroller 390 operating in cooperation with the exemplary ICV-Lite 210. The microcontroller 390 can be referred to as a modified digital autopilot control (DAC) contained within the canister 170.

One should distinguish the ordnance from the payload. For purposes of the disclosure, the ordnance represents a missile launched from a naval platform, while the payload denotes a package that activates towards an intended target after initial launch. For example, the VLA includes a booster motor, which propels the missile in the atmosphere, as well as a torpedo for payload for terminal engagement. The payload simulator 370 connects to input payload 320 and mimics such characteristics. The launcher controller 380 connects to data transfer 360 and interfaces with the canister 170. For such tests, the canister 170 remains empty, so the ICV-Lite 210 interfaces with the ordnance microcontroller 390. The ordnance microcontroller 390 connects to associated connectors for payload 330, payload 340 and data transfer 350 and provides input signals to mimic live fire operation.

A first cable (not shown) links the input payload connector 320 to the payload simulator 370. Second, third and fourth cables (not shown) link the output payload, hardware simulation and output data transfer connectors 330, 340 and 350 to the ordnance microcontroller 390. A fifth cable (not shown) links the input data transfer connector 360 to the launch controller 380. The payload simulation circuitry connector 340 enables access for hardware simulating components to output appropriate signals. Output data transfer circuit connector 350 and input data transfer circuit connector 360 enable access for components involved with communicating between two separate external systems in the appropriate time sequence.

The presence of the external sources necessitates description for understanding the function of the ICV-Lite 210. While there are various methods for delivery of external signals, the presently preferred embodiment provides such connections in the following manner. External system signals are carried on 22-gauge wire, according to the American Wire Gauge (AWG). These wires group together into corresponding cables. Such cables are configured on either end with a plug connection corresponding to a jack connection on ICV-Lite 210 and the external system. In this case, cable design subject to specific standards defined by the U.S. Navy. The number of cables and configured connections presented for the ICV-Lite 210 are not to be taken in a limiting sense. These parameters are subject to variation so long as the identified signals are delivered in a functional manner, enabling operation of the ICV-Lite 210.

The external ordnance microcontroller 390 provides signal inputs corresponding to that expected of a live version for the desired ordnance. This microcontroller 390 is a component normally utilized in various types of live ordnance, but this particular component was never installed for live use. Connections to the ordnance microcontroller 390 are facilitated from a collection of cables. The payload simulator 370 enables access to signals expected for a range of differing payload types. The first cable enables connection to the payload simulator 370 with the input payload connector 320. The ICV-Lite 210 evaluates launcher control systems 380. The signal inputs, processing, and responses are necessary to realize proper function of the ICV-Lite 210.

Figure 4:
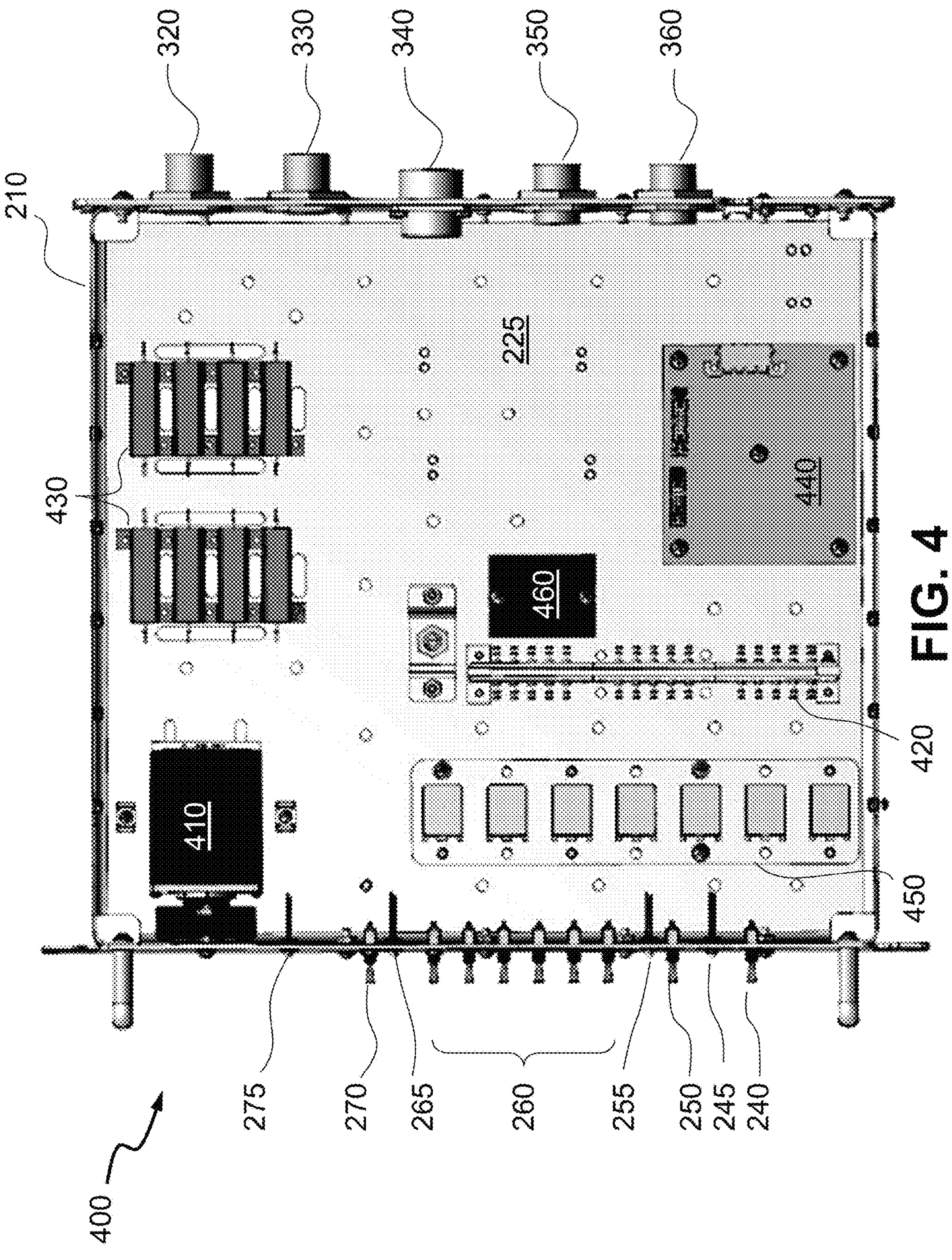
FIG. 4 is a plan view of the electronic shelf assembly.

FIG. 4 shows a plan top view 400 of the ICV-Lite electronic shelf 225 assembly. The electronic shelf 225 organizes the components necessary for realizing the ICV-Lite 210. Components located within the shelf 225 subject to external operator setup, rendering their functional use by components mounted to the shelf 225 on the front 230 and rear 310 panels. A falling edge time-delay relay 410 is necessary for automated transfer of power to the ordnance microcontroller 390 based on signals provided from the launcher controller 380. The relay 410 mounts behind the front panel 230 and straps to the bottom of shelf 225 for security. A prototype embodiment utilized an example relay from Macromatic with the part number TD-82268-40 to fulfil this purpose (see https://www.macromatic.com/products/time-delay-relay/td-8-series). A solid state relay 420 enables simulating specific hardware functions on sensitive circuits requiring large loads.

Hardware simulation of a thrust vector controller is necessary to realize the ICV-Lite 210. Such actual components require heavy loads as provided by the thrust vector control (TVC) simulator load resistors 430. The actual circuitry providing thrust vector controller simulation located on a TVC printed circuit card 440. A terminal board 450 incorporates various components, including resistors and diodes. Multiple double pole double throw (DPDT) coil relays 460 are necessary to properly process signals in an appropriate time sequence and simulate live hardware responses.

That terminal board 450 provides multiple isolated conductive posts enabling attachments of components between posts, and wires connecting to specific components via such posts. The terminal board 450 also serves as a useful point of contact for distribution of $+28V_{DC}$ and voltage return lines. The organization of components, as displayed in view 400, is not meant to be taken in a limiting sense and merely serves as an example of organized component layout intended for the durability of the ICV-Lite 210.

Figure 5:
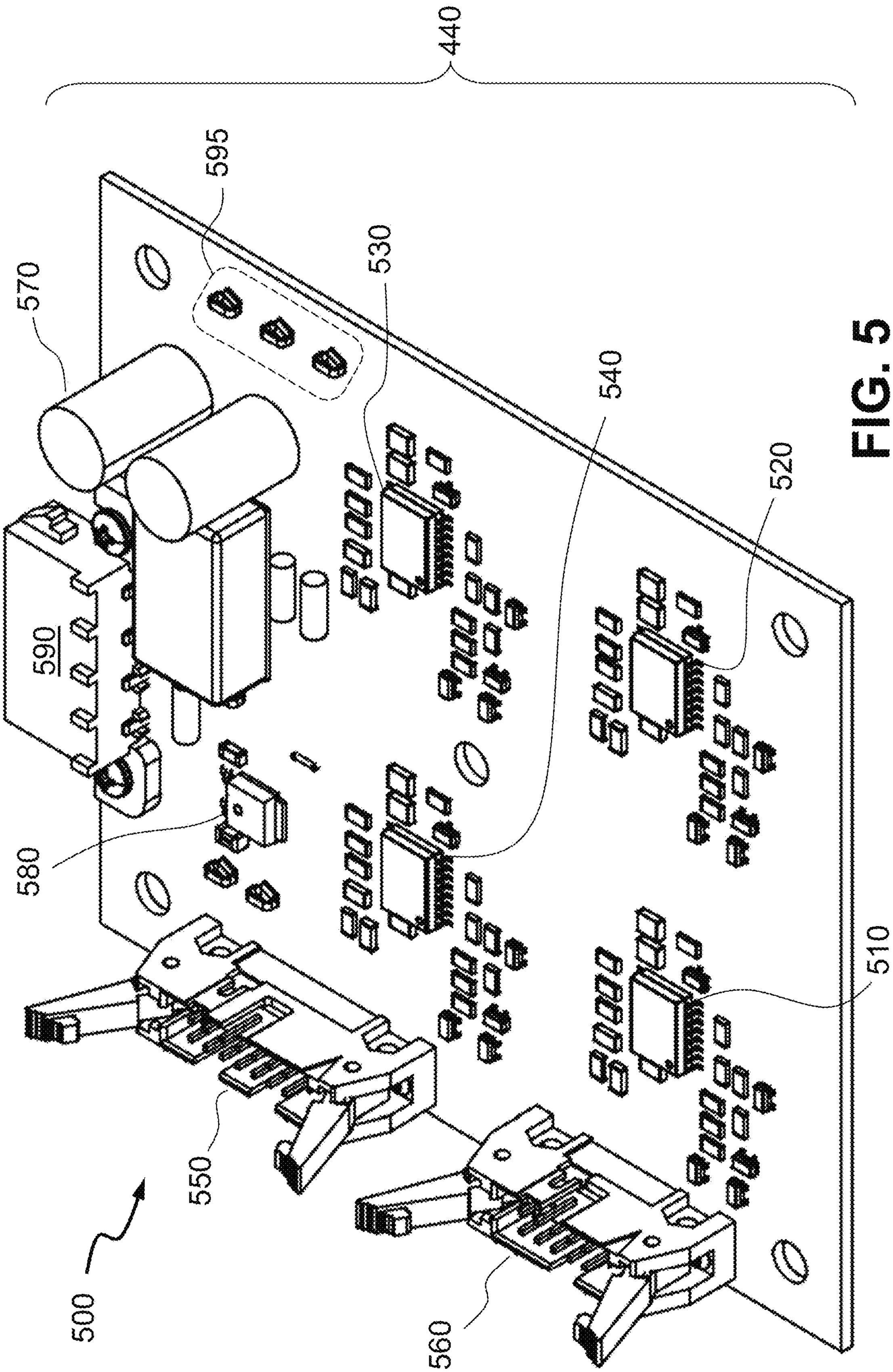
FIG. 5 is an isometric view of the printed circuit card.

FIG. 5 shows an isometric view 500 of the TVC printed circuit card 440, which contains circuitry necessary for simulating a live thrust vector controller (TVC). In this case, four vanes of a rocket are simulated in four identical signal processing circuits providing valid responses. TVC components required for circuit of vane-1 510 are organized together. This configuration is the same for all necessary vanes and may extend to as many vanes needed for simulation. This extends to vane-2 520, vane-3 530, and vane-4

540. Inputs for the vane signals are provided by the ordnance microcontroller 390 and received on the input jack connection 550.

These input signals contain positive and negative analog voltage values processed by a series of cascading operational amplifier circuits. Once processed the signals are sent using the output jack connection 560 for proper system response by the ordnance microcontroller 390. The circuit card 440 also hosts the ±15V and +5V voltage regulator circuits 570 and 580 respectively. These voltage regulators step down the voltage provided by the $+28V_{DC}$ power from the power supply 220. Input and output power for the printed circuit card 440 are provided with the power jack 590. The values of these outputs are tested on voltage test points 595.

Section 11—Electrical Design: Description shifts component connection to realize ICV-Lite 210. Components group according to specific categories of functions necessary for simulating a missile launch, as is the case with the ICV-Lite 210. Each component grouping connects to exterior cables through jack connectors mounted to the rear panel 310 as observed in view 300. These cables serve to deliver the incoming and outgoing signals to and from the simulator and external systems. Specific jack labeling in the schematic drawings is arbitrary to the signal delivery method for the presently preferred embodiment of ICV-Lite 210 and are not intended in a limiting sense.

Figures 6A, 6B, 6C:
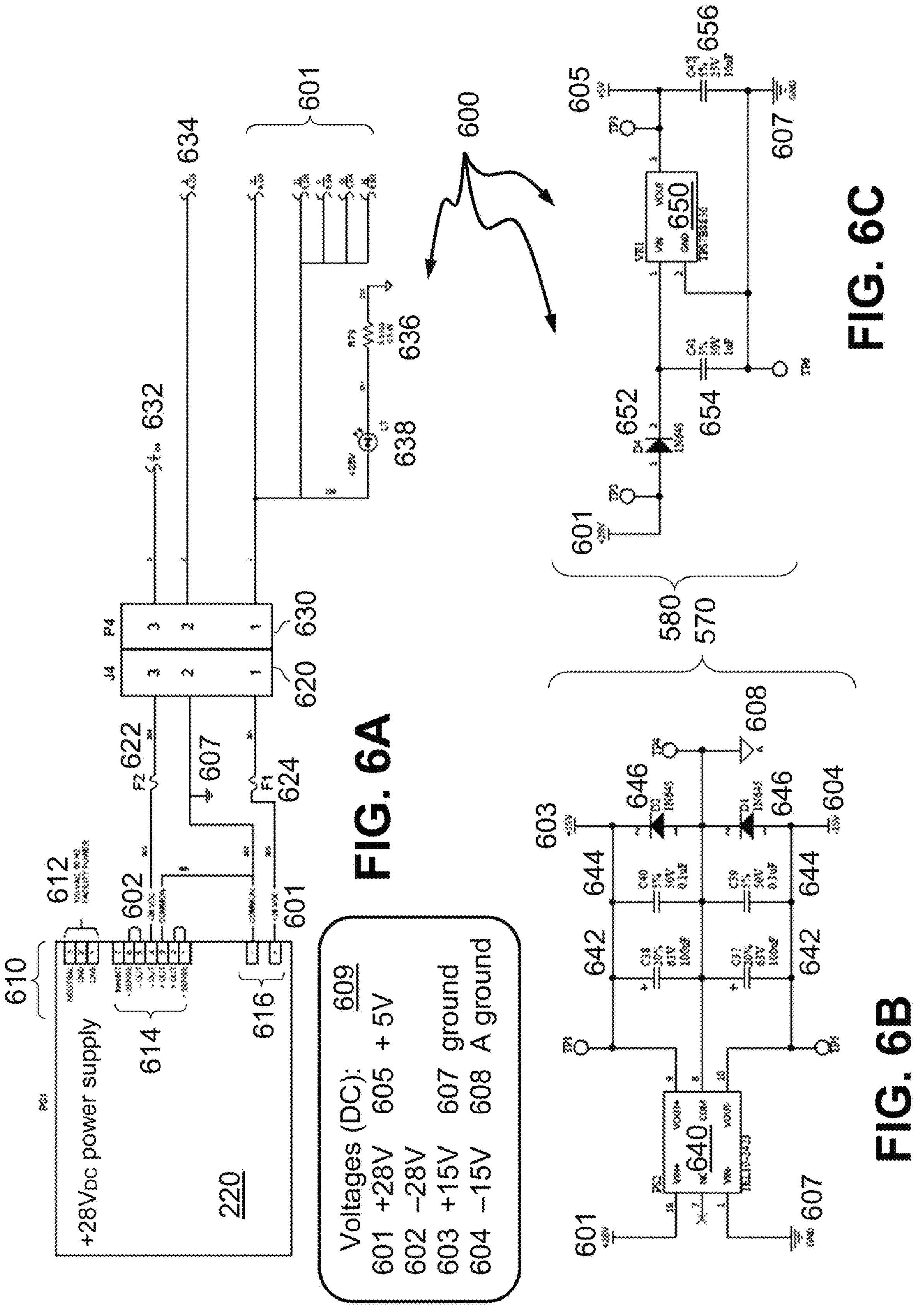
FIGS. 6A, 6B and 6C are schematic views of power distribution circuitry.

FIGS. 6A, 6B and 6C show schematic views 600 of the power distribution circuitry. In FIG. 6A, the primary source of power for the ICV-Lite 210 comes from a dual channel $\pm 28V_{DC}$ power supply 220. Labels for direct current (DC) power are listed as follows: $+28V_{DC}$ 601, $-28V_{DC}$ 602, $+15V_{DC}$ 603, $-15V_{DC}$ 604, $+5V_{DC}$ 605, chassis ground fixed potential 607 and return line analog ground 608, as presented in legend 609. This power supply 220 accepts an alternating current input 612 of $120V_{AC}$ at 60 Hz for conversion to two separate outputs of $+28V_{DC}$ 601 and $-28V_{DC}$ 602.

DC output power is provided by supply 220 through connectors 614 and 616 to a jack 620 via lines with ground 607 and fuses 622 and 624. The jack 620 (similar to the jack 590 on the board 440) connects to a plug 630, which connects to a power outlet 632 for $-28V_{DC}$ 602, an electrical component return line 634 that joins both (28V) DC outputs and supply lines for $\pm 28V_{DC}$ 601, one of which includes a 3.3 kΩ resistor 636 as R79 and an indicator LED 638 as L7 that illuminates the PSU verifier 275 on the front panel 230.

FIG. 6B features a first voltage regulator 640 of circuit 570, which receives $+28V_{DC}$ 601 and connects to ground 607. The regulator output of $+15V_{DC}$ 603 includes a parallel circuit to an analog ground 608 with series pairs of 0.1 mf capacitors 642 as C37 and C38 and 0.1 μf capacitors 644 as C39 and C40 and 1N645 diodes 646 as D1 and D2. FIG. 6C features a second voltage regulator 650 of circuit 580, which receives $+28V_{DC}$ 601 via another 1N645 diode 652 and connects to ground 607 via a 1 μf capacitor 654. The regulator output of $+5V_{DC}$ 605 includes a grounded 10 μf capacitor 656.

The power supply indicator LED 638 provides visual affirmation of $+28V_{DC}$ power 601 application to the components on the terminal board 450, analogous to indicator LED 275 on the front panel 230, albeit not always sharing the same status. This LED 638, along with all others referenced in this description, accepts an input of $+5V_{DC}$ 605 utilizing the 3.3 kΩ resistor 636 to provide a load causing a voltage drop from the $+28V_{DC}$ input power 601 down to the $+5V_{DC}$ 605 accepted input voltage.

In order to protect the components receiving power the 3 A slow blow fuse 624 is installed in series with the $-28V_{DC}$ output 602 and the 20 A fuse 622 is disposed in series with the $+28V_{DC}$ output 601. These outputs 601, 632, and the common voltage reference line 634 distribute to the other components through a jack 620 and plug 630 connection. Certain components of the ICV-Lite 210 require $\pm 15V_{DC}$ inputs 603, which are fulfilled with voltage regulator 640. This regulator 640 takes an input of $+28V_{DC}$ 601 power for scaling down to the required $+15V_{DC}$ 603 and $-15V_{DC}$ 604 outputs. This first regulator 640 also references the chassis ground 607 on input and the analog ground 608 on output for the common return line.

In order to ensure consistent steady outputs for this first voltage regulator 640, the capacitors and diodes configure as follows. Two 100 μf capacitors 642 are arranged in series: C38 connecting $+15V_{DC}$ line 603 to the regulator's common return line 634 at analog ground 608 and C37 connecting the $-15V_{DC}$ line 604 to the regulator's common return line 634. In parallel with the previous capacitors 642, two 0.1 μf capacitors 644 are arranged in series, C40 connecting $+15V_{DC}$ line 603 to the regulator's common return line 634 and C39 connecting the $-15V_{DC}$ line 604 to the regulator's common return line 634. In parallel with the first 642 and second 644 sets of capacitors, two diodes 646 are disposed in series, of which D2 connects the $+15V_{DC}$ line 603 as the regulator's cathode while D1 connects the $-15V_{DC}$ line 604 as the ground cathode.

Some components of the ICV-Lite 210 require $+5V_{DC}$ inputs 605, which are fulfilled with second voltage regulator 650, which receives an input of $+28V_{DC}$ 601 power and scales it down to the required $+5V_{DC}$ 605 outputs. This regulator 650 also references the chassis ground 607 on input and output. In order to ensure consistent steady outputs for this voltage regulator 650, capacitors 654 and a diode 652 are configured as follows. The diode 652 connects to the input voltage with $+28V_{DC}$ 601 at the anode, while the cathode connects to ground 607. The 1 μf capacitor 654 connects the regulator 650 at the $+28V_{DC}$ input line 601 to ground 607. The 10 μf capacitor 656 connects the regulator 650 at the $+5V_{DC}$ output line 605 to ground 607.

Figure 7:
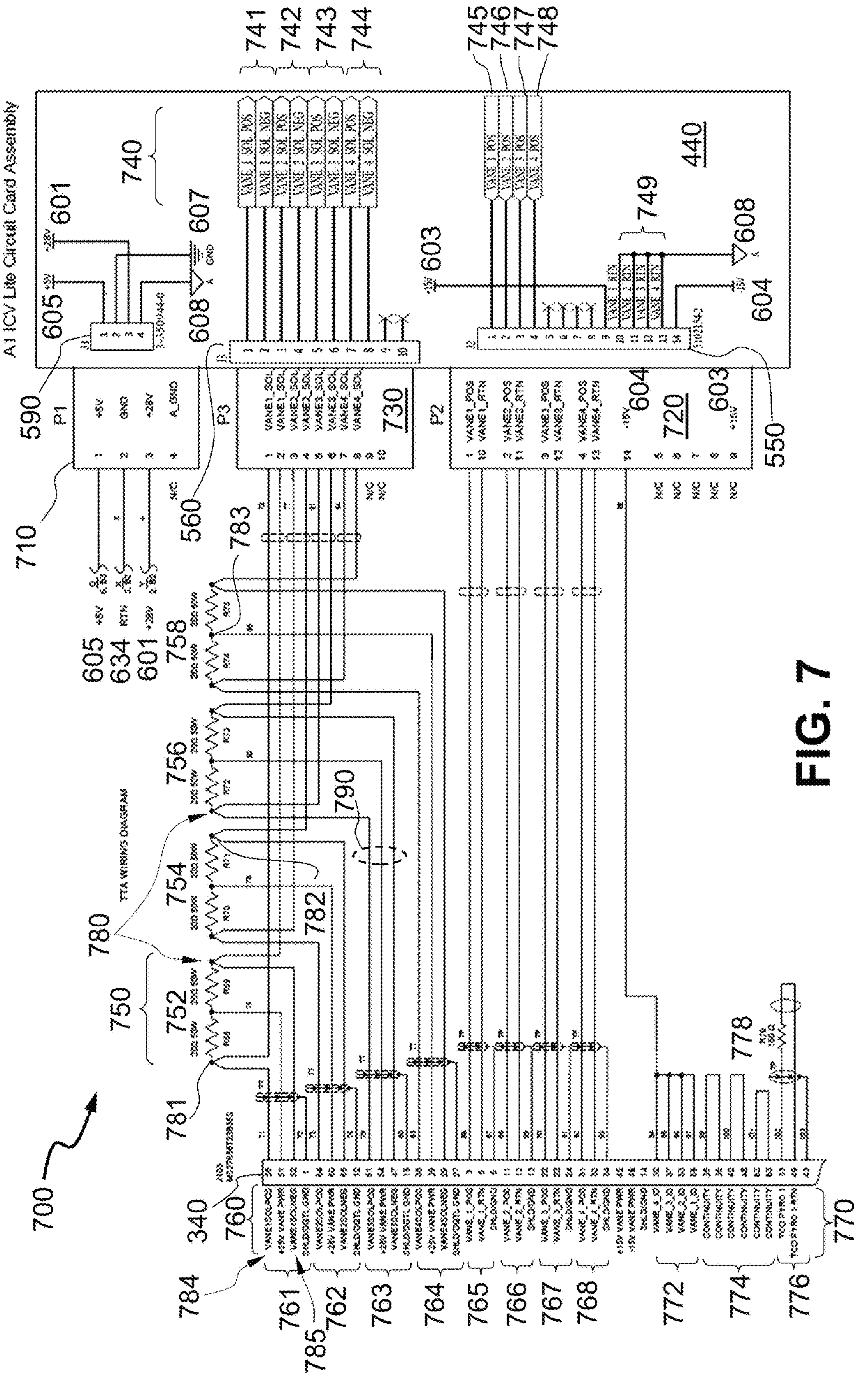
FIG. 7 is a schematic view of the power distribution circuitry.

FIG. 7 show a schematic view 700 of the circuit card 440 for thrust vector control (TVC) that connects to first, second and third plugs 710, 720 and 730. This circuitry receives inputs from the ordnance microcontroller 390 on connector 340 as junction J103. DC power labels conform to those in legend 609, although ground connections may relate to alternate hardware. These input signals pass through this circuitry before entering the TVC printed circuit card 440 for signal processing. The circuitry exhibited herein replicates the hardware observed within input for a thrust vector controller of live launching system ordnance. The circuit card 440 includes power jack 590 as J1 that connects to the first plug 710 as P1 input jack 550 as J2 that connects to the second plug 720 as P2 and output jack 560 as J3 that connects to the third plug 730 as P3.

The printed circuit card 440 includes vane solenoid junctions 740. These include positive and negative outputs to vane-1 741, vane-2 742, vane-3 743 and vane-4 744 that connect to the output jack 560. These further include positive inputs to vane-1 745, vane-2 746, vane-3 747 and vane-4 748 as well as their collective returns 749 to analog ground 608 connecting to the input jack 550. The third plug 730 for the vane solenoids connects to 20Ω resistor series pairs 750: first pair 752 with R68 and R69 for vane-1, second pair 754 with R70 and R71 for vane-2, third pair 756 with R72 and R73 for vane-3 and fourth pair 758 with R74 and R75 for vane-4. These signal pairs 750 provide electrical load to simulate vane actuation.

Input vane command signals 760 on connector 340 include solenoid positive, electrical power, solenoid negative and ground, and apply to vane-1 761, vane-2 762, vane-3 763 and vane-4 764, as well as return signals for vane-1 765, vane-2 766, vane-3 767 and vane-4 768. Output vane signals 770 include vane identification 772 for each of the four vanes that connect to input $-15V_{DC}$ 604, continuity 774 and thrust cutoff 776, also connected to 0.16 kΩ resistor 778 as R78. Each resistor series 750 contains nodes 780 separating the resistors: left 781, right 782 and center 783. Input vane signals 760 for each separate vane connecting to respective nodes 780 include positive servo command 784 and negative servo command 785. For each vane, insulated wires 790 connecting to the nodes 780 can congregate as twisted shield wire.

In order to power the circuitry of the card 440, $+28V_{DC}$ 601 and the voltage return line 634 connect to the card 440 using first plug 710 and power jack 590. This also establishes the analog ground 608 and chassis ground 607 on the circuit card 440, which connect together thereto. This separation of analog 608 and chassis 607 grounds serves to reduce noise on the analog components. The power jack 590 and first plug 710 also serve to deliver the $+5V_{DC}$ signal 605 from voltage regulator 650, located on circuit card 440, to other components as necessary. Input signals from the ordnance microcontroller 390 carry signals originally intended to control servomotors on the vanes of live launch-capable ordnance.

For each vane, there are positive and negative servomotor signals and a $+28V_{DC}$ power signal 601 provided by the external microcontroller 390. In order to simulate the electrical resistance loads of these vane servomotors, the ICV-Lite 210 utilizes voltage divider circuits 750 with a pair of 20Ω resistors in series for their respective vanes. The center node 783 between each two paired resistors carries the $+28V_{DC}$ signal 601. The left node 781 connects to the positive servomotor command 784. The right node 782 connects to the negative servomotor command 785. These signals enter the circuitry as three separate signals: $+28V_{DC}$ signal 601, positive servo command 784 and negative servo command 785, with the three wires 790 carrying these signals twisted around one another and shielded. The shield for these input wires 790 connects to an external shield return line, which connects to ground 607.

On the same nodes 781 and 782 connecting to the positive and negative signal lines 784 and 785 respectively, wires connect these two respective signals to inputs on the TVC circuit card 440 via the third plug 730 to the output jack 560. The two wires carrying these signals to the circuit card 440 are enveloped in a two-wire shield. This configuration matches across all vanes required for ordnance simulation.

In the presently preferred embodiment of ICV-Lite 210 there are four vanes connected in this manner, described as follows. Vane-1 input signals 761 connect to the simulated vane-1 load 752, as previously described. For vane-1, the positive 784 and negative 785 servomotor command signals 741 connect from the vane-1 load 752 to the printed circuit card 440 for signal processing. Similarly, vane-2 input signals 762 connect to the simulated vane-2 load 754. Also, positive and negative servomotor command signals for vane-2 742 connect from the vane-2 load 754 to the printed circuit card 440 for similar purposes as vane-1. Vane-3 input signals 763 connect to the simulated vane-3 load 756, while positive and negative servomotor command signals for vane-3 743 connect from the vane-3 load 756 to the printed circuit card 440. Vane-4 input signals 764 connect to the simulated vane-4 load 758, while positive and negative servomotor command signals for vane-4 744 connect from the vane-4 load 758 to the printed circuit card 440.

The previously described signal inputs are processed on the TVC printed circuit card 440, output through jack 560, and received by signal wires on the plug 730. The positive 784 and negative 785 signal responses from this signal processing are then return-delivered to the ordnance microcontroller 390 for verification. Signal processing responses for the negative signal 785 cause the vanes to turn in the opposite angular direction as the positive 784. As such, all outputs for the negative signal return lines 749 collectively reference analog ground 608. Signal processing responses for the positive input signals 745, 746, 747 and 748 require a specific response, depending on the signal sent from the ordnance microcontroller 390.

Vane-1 output for the positive signal response line 745 and negative signal response line connect back to the ordnance microcontroller 390, using payload jack 340, as a shielded twisted pair input 765 where the shield grounds to the external system. For vane-2, vane-3 and vane-4, the respective positive signal responses correspond to lines 746, 747 and 748. Similarly, for vane-2, vane-3 and vane-4 the respective shielded twisted pairs correspond to inputs 766, 767 and 768.

The ordnance microcontroller 390 expects $-15V_{DC}$ 604 signal responses. The TVC circuit card 440 generates these signals using voltage regulator circuit 640. This signal outputs on jack 560 are received by the second plug 720. This wire delivers this signal to payload jack 340 on all required connection points 772. Particular sections of the ordnance microcontroller expect continuity in the circuit as provided by hardwired circuitry 774 on jack 340. Similarly, the ordnance microcontroller 390 requires a signal input, hardware response, and a return line for safety. This is fulfilled by the load circuit 776 using a 0.16 kΩ resistor R76 778. The load circuit 776 connects in a shielded twisted pair where the shield references ground 607 on the external system.

Figure 8:
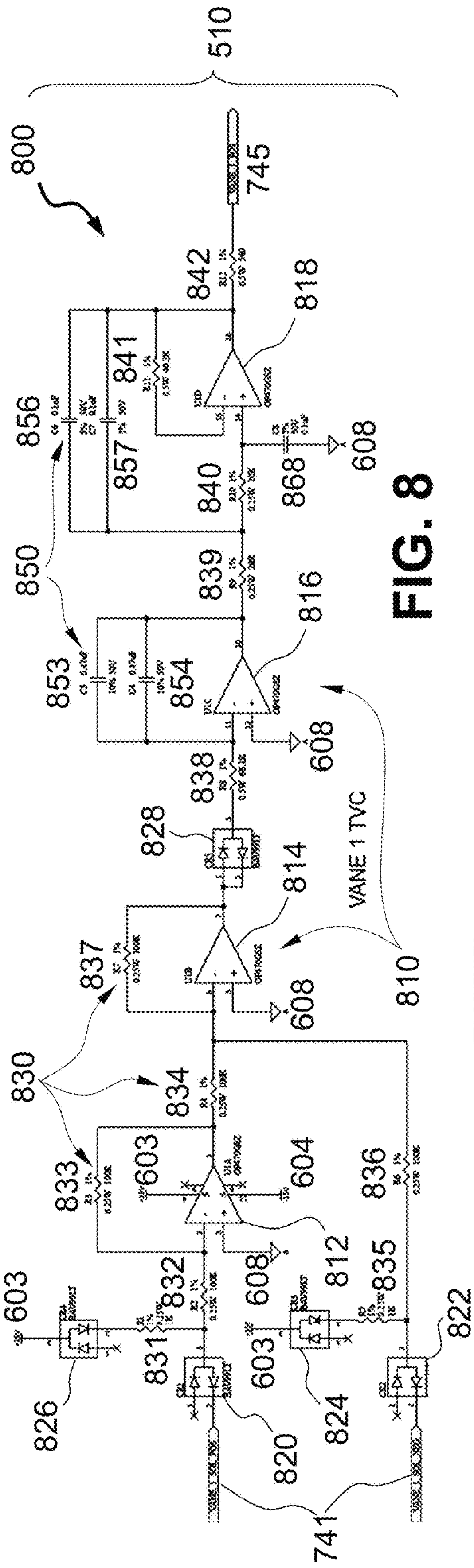
FIG. 8 is a schematic view of the thrust vector control (TVC) input/output circuitry.

FIG. 8 shows a schematic view 800 of the TVC signal processing circuitry for vane-1 510 common to all the vane-2 through vane-4 520, 530 and 540 for ordinance simulation and connecting to circuit board 440. Observed on the opposite side of jacks 550 and 560, establishment of this circuitry 510 involves a series of cascading operational amplifier (op-amp) configurations. The components include OP470G8Z op-amps 810 as U1A 812, U1B 814, U1C 816 and U1 D 818, along with BAV99LT dual-diodes CR1 820, CR2 822, CR3 824, CR4 826 and CR5 828. All operational amplifiers in this configuration receive $+15V_{DC}$ 603 and $-15V_{DC}$ 604 power inputs, and all grounds reference analog ground 608.

Additional components include resistors 830 (among the resistor set 430) as R1 831 at 1 kΩ, R2 832 at 100 kΩ, R3 833 at 100 kΩ, R4 834 at 100 kΩ, R5 835 at 1 kΩ, R6 836 at 100 kΩ, R7 837 at 100 kΩ, R8 838 at 68.1 kΩ, R9 839 at 20 kΩ, R10 840 at 20 kΩ, R11 841 at 40.2 kΩ and R12 842 at 0.56 kΩ; and capacitors 850 as C3 853 at 0.47 μf, C4 854 at 0.47 μf, C5 856 at 1 μf C7 857 at 0.1 μf and C8 858 at 0.1 μf. For vane-1, a pair of input signals 741 (positive and negative) are received and processed to produce an output vane position signal response 745. The negative input signal 741 enters the circuit 510 and passes through diode 822 if negative, and is not passed if positive.

Similarly, a power $+15V_{DC}$ 603 signal passes through diode 824 and a 1 kΩ load resistor, before entering the circuit 810 and combining with negative input signal 741. Input signals 741 enter the circuit and pass through diode 820 if negative, and not passed if positive. Similarly, a $+15V_{DC}$ 603 signal passes through diode 826 and a 1 kΩ load resistor, before entering the circuit and combining with positive input signal 741. This combined signal then passes through op-amp 812 in an inverting buffer configuration with the non-inverting input connected to ground. This inverting buffer configuration utilizes a 100 kΩ resistor R2 832 on the inverting input and a 100 kΩ feedback resistor R3 833. The negative input signal 741 enters through the inverting input and becomes inverted on the output 745. Both input signals 741 are combined, after the negative processes by the inverting buffer for combination with $+15V_{DC}$ 603.

This combined signal then passes through op-amp 814 in an inverting buffer configuration with the non-inverting input connected to ground. This inverting buffer configuration utilizes 100 kΩ resistors R4 834 and R6 836 on the inverting input and a 100 kΩ feedback resistor R7 837. Note that the two combining signals, prior to processing by op-amp U1B 814, must pass through their own input resistors R4 834 and R6 836 for proper convolution of the signal. For an op-amp, the input signal enters through the inverting input (upper left) and is inverted on the output (right), while the non-inverting input (lower left) connects to ground 607.

Next, the signal passes through an anti-parallel diode configuration 828 to protect against any potential for large voltage differentials. This signal enters op-amp U1C 816 in an integrator configuration with the non-inverting input connected to ground 607. This integrator configuration utilizes two 0.47 μf feedback capacitors C3 853 and one 68.1 kΩ resistor R8 838 on the inverting input. This means upper negative node of the op-amp provides the inverting input, while the non-inverting input is grounded. The input signal to op-amp U1C 816 undergoes mathematical integration before exiting to the output.

In the cascade processing this signal, op-amp U1D 818 employs a low-pass filter designed in a Sallen & Key configuration, with a cutoff frequency of 56 Hz. The voltage divider uses 20 kΩ resistors R9 839 and R10 840 arranged in series across the inverting input and the output of op-amp U1D 618, with feedback via 40.2 kΩ resistor R11 841 connected in between. Two 0.1 μf feedback capacitors C6 856 and C7 857 are arranged in parallel between inverting input and output of op-amp U1D 818. The grounded 0.1 μf capacitor C8 858 connects immediately after the voltage divider and before the non-inverting input for op-amp U1D 818. The output signal 745 passes through 0.56 kΩ resistor R12 842 before exiting.

Figure 9:
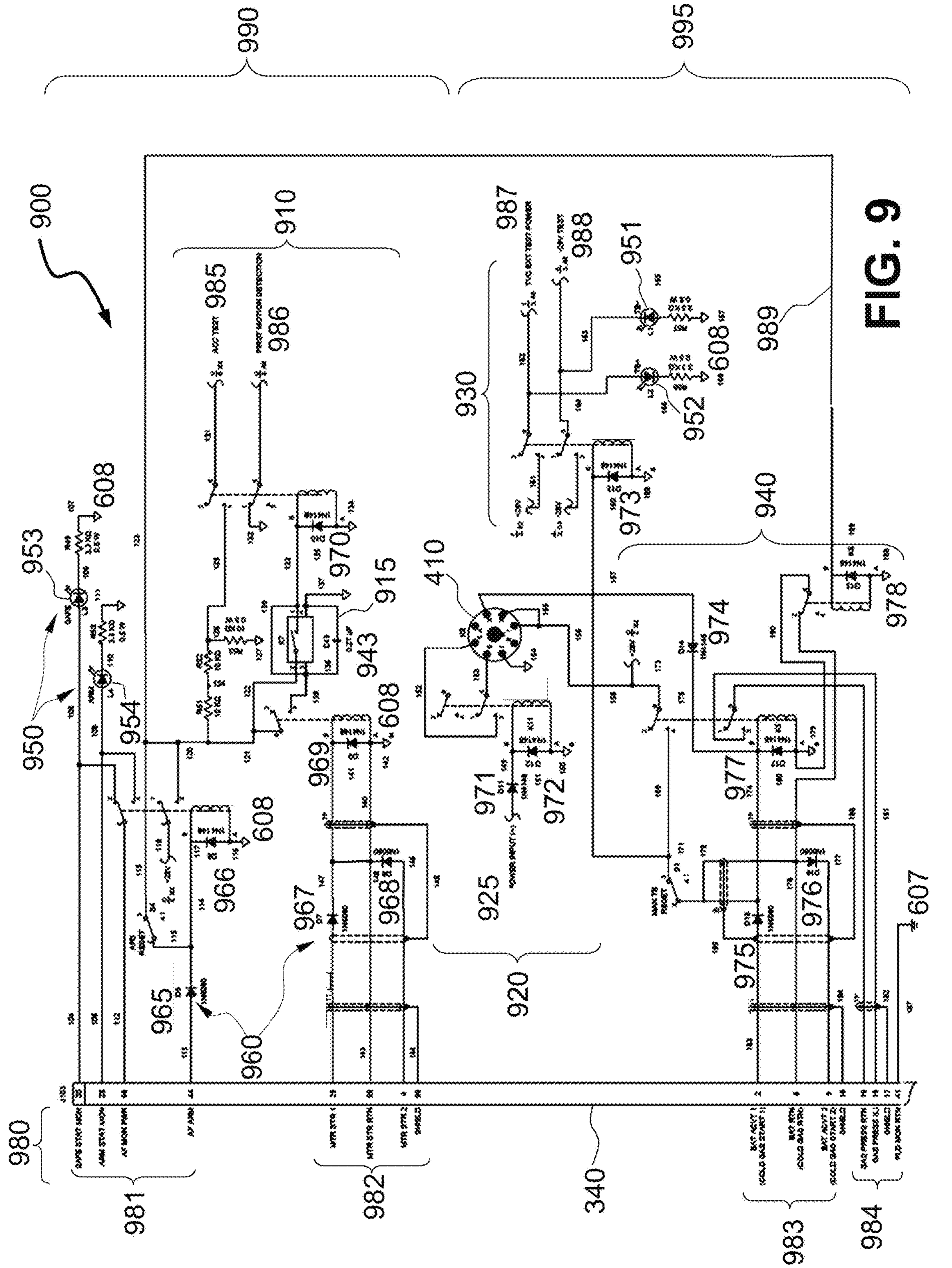
FIG. 9 is a schematic view of the TVC processor circuitry.

FIG. 9 shows a schematic view 900 of TVC hardware simulation circuitry that attaches to payload jack 340. This circuitry includes test circuit 910 with relay base 915, relay circuit 920 with power input 921 and a falling edge relay 410, power circuit 930 and battery circuit 940. One 0.27 μf capacitor C43 943 is included in the relay base 915. LEDs 950 include L1 951, L2 952, L3 953 and L4 954. Diodes 960 include D5 965, D6 966, D7 967, D8 968, D9 969, D10 970, D11 971, D12 972, D13 973, D14 974, D15 975, D16 976, D17 977 and D18 978. Signal connectors 980 include monitors 981, indicators 982, battery activation 983, gas release 984, test 985, motion detection 986 and reset 989. Additional details are provided for upper 990 and lower 995 sections.

Figure 10A:
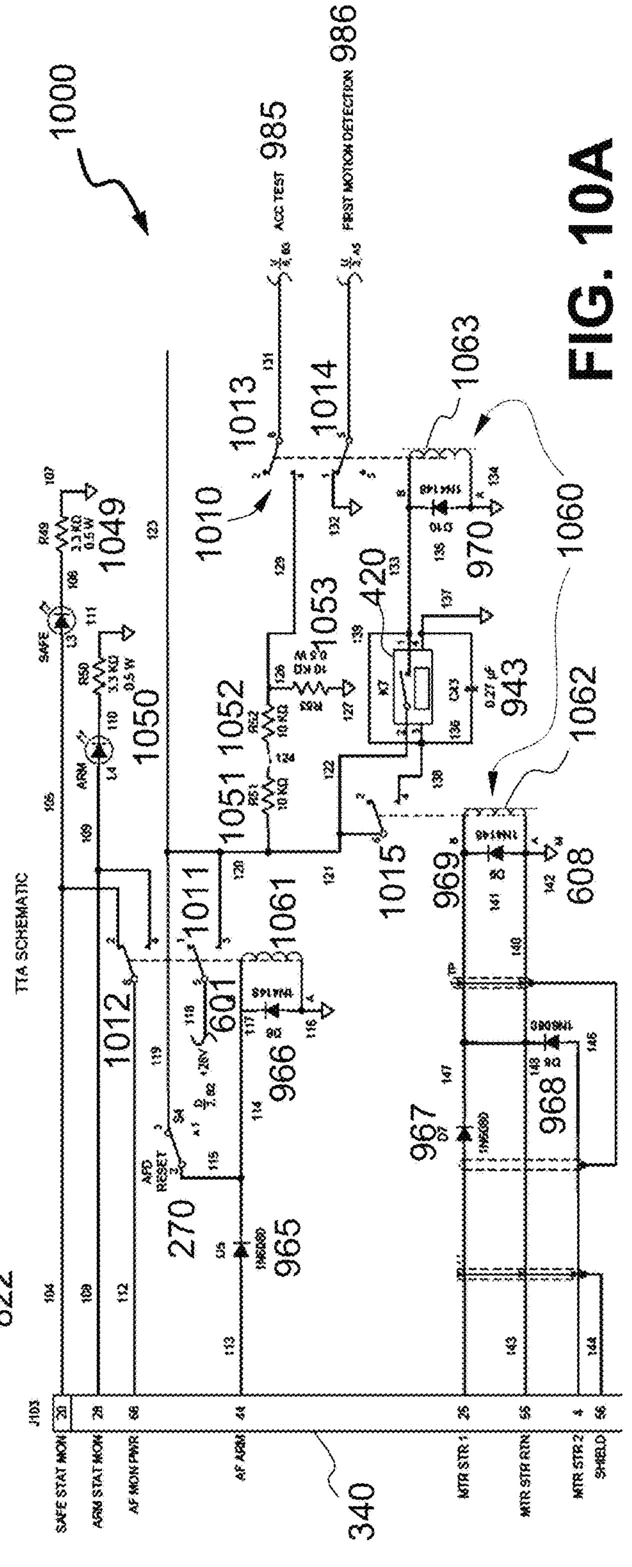
FIGS. 10A and 10B are detail schematic views of the TVC circuitry.
Figure 10B:
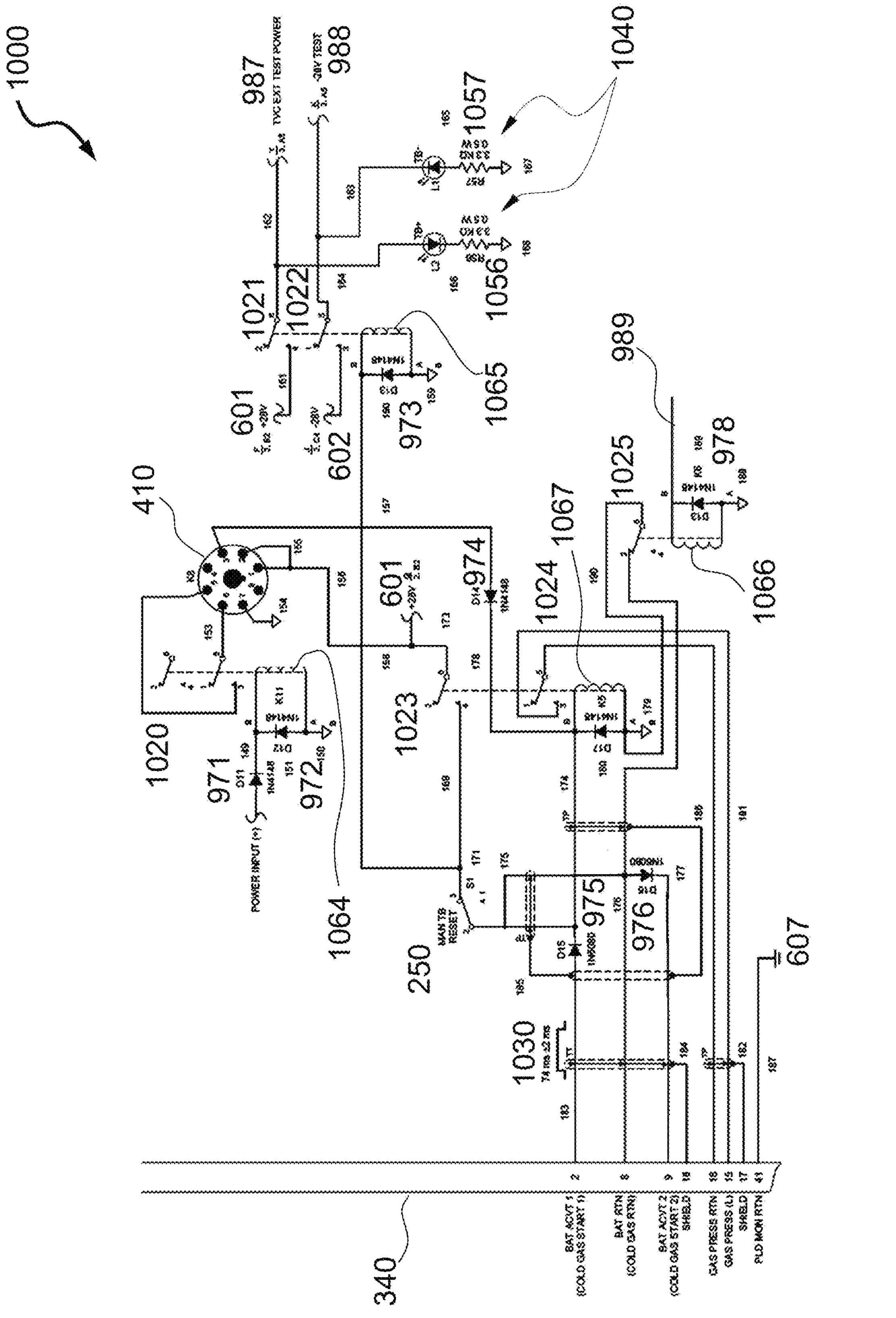

FIGS. 10A and 10B show schematic detail views 1000 of hardware simulation circuitry from respective sections 990 and 995. Additional components include switches and poles 1010. Note that select devices may be double-pole-double-throw (DPDT). These are listed in section 990 as AFD reset switch 270, solid state relay 420 within base 915, pole 1011, pole 1012, pole 1013, pole 1014 and pole 1015; and in section 995 as thermal battery reset switch 250, double pole 1020, pole 1021, pole 1022, pole 1023, pole 1024 and pole 1025.

Battery activation 983 includes square-wave signal 1030. Resistors 1040 include R49 1049, R50 1050, R51 1051, R52 1052, R53 1053, R54 1054 and R57 1057 distributed among both sections. Induction relay DPDT coils 1060 to inductively transmit signals include coil 1061 parallel to diode 966, coil 1062 parallel to diode D9 969, coil 1063 parallel to diode D10 970, coil 1064 parallel to diode D12 972, coil 1065 parallel to diode D16 976, coil 1066 parallel to diode D17 977 and coil 1067 parallel to diode D18 978.

This circuitry receives inputs from the ordnance microcontroller 390 on payload connector 340. The circuitry exhibited here simulates the hardware observed within VLS ordnance, but may be modified to fulfil other launching ordnance. The simulation provided by the embodied circuitry contains relays assembled to enable signal activation within the required time interval expected by external systems. All DPDT coil relays 1060 within this circuit contain a diode between the input power leg and ground leg, with the cathode facing the input power leg, with all ground legs on the relays connecting to analog ground 608. All LED circuitry contains an LED 950 connected to a +5V power signal 605 and the ground leg connecting to a 3.3 kΩ resistor (R49 or R50) connected to analog ground 608.

This schematic view 900 is separated into two sections 990 and 995. Section 990 performs arm/safe and motor ignition hardware simulation. The ordnance microcontroller 390 sends signal 989 indicating intent to “arm” the simulated ordnance. Signal 989 passes through diode D5 965 before connection to momentary reset switch 270 and DPDT coil relay 1061. That reset switch 270 enables this signal to remain continuous and affect circuit subsection 995 until operator input activates the switch 1025, opening the circuit, and interrupting the arming process. DPDT coil relay 1061 connects the power input leg to the signal 989 for triggering upon receipt of the arm signal 981. Pole 1012 on relay 1061 activates a switch providing monitor power, from microcontroller 390, to the base of pole 1012, which is initially connected, providing power to LED L3 953, indicating a safe status. LED L4 954 indicates arming status.

When pole 1012 is triggered by relay 1061 power is removed from LED L3 953 and applied to LED L4 954 indicate an arm status, and demonstrating the change of status on front panel 160. Pole 1011 on relay 1061 activates the switch 1012 with $+28V_{DC}$ 601 connected to the base of pole 1011. The initial condition of pole 1011 is an open circuit, but once triggered by relay 1061, the pole 1011 closes. Closing this circuit at reset switch 270 enables $+28V_{DC}$ 601 to flow in the following three different directions. First, the $+28V_{DC}$ 601 signal combines with signal 989. Second, $+28V_{DC}$ 601 enters a resistor bank containing three 10 kΩ resistors R51 1051 and R52 1052 connected in series and one potentiometer 420, set to 20 kΩ, in parallel. The end of this resistor series splits off and connect to analog ground 608 and pole 1015 on relay 1063, which is typically open.

Third, the $+28V_{DC}$ 601 signal connects to the base of pole 1012 on relay 1062 and the base of solid state relay 420, which utilizes the 0.27 μf capacitor C43 943 between the input power and ground legs per manufacturer recommendation. Input signals 982, from microcontroller 390, indicate when the ordnance simulator is ready for "ignition" for launch. These signals 982 are assembled in a three wire shielded twist with the shield grounded on external microcontroller 390. These input signals 982 contain a primary and backup signal configured in the same manner. Both signals must pass through a diode D8 968 and a 1Ω resistor R55 1055 before acting as a trigger mechanism activating DPDT coil relay 1062 and proceeding back on the expected return line for microcontroller 390.

This simulates both the load expected by an ignition circuit and enables relay 1062 to trigger other simulator circuits mimicking an "ignition" reaction. The relay 1062 only utilizes pole 1015 when triggered. Pole 1015 exists in a normally open configuration with the base (as analog ground 608) connected to $+28V_{DC}$ 601 after the triggering of relay 1061. When relay 1062 triggers, pole 1015 connects the $+28V_{DC}$ 601 signal to the power input on solid state relay 420 to pass $+28V_{DC}$ 601 signal on to trigger DPDT coil relay 1063, which utilizes both poles 1013 and 1014. One pole connects signal 986 (sourced from microcontroller 390) to ground 608 in a normally closed configuration, which will open circuit the signal once relay 1063 is triggered.

Another pole 1013 exists in a normally open configuration with the base connected to resistor series R51 1051 and R52 1052 and connects to signal 985 (sourced from microcontroller 390) to that resistor series upon triggering of relay 1063. Section 995 performs battery activation hardware simulation. The ordnance microcontroller 390 sends signals 983 to activate a simulated ordnance battery. These signals 983 are assembled in a three-wire shielded twist with the shield grounded on external microcontroller 390. These input signals 983 contain a primary and backup signal configured in the same manner. Both signals must pass through a diode D16 976 before connecting to the power input leg of DPDT coil relay 1067 and proceeding back on the expected return line for microcontroller 390.

This simulates both the load expected by an ignition circuit and enables relay 1062 to trigger other simulator circuits mimicking an "ignition" reaction. The node connecting to the power input leg of relay 1067 connects the base 915 of momentary battery reset switch 250, which exists in a normally closed configuration and enables operator input to interrupt the application of battery power. When left untouched, the normally closed feature of reset switch 250 enables for the flow of power into a connection on pole 1023 and the power input leg of DPDT coil relay 1065. Relay 1067 may be triggered by the battery activate signals 983, but is primarily triggered by the falling edge relay 410. Once triggered, relay 1067 activates its two poles 1023 and 1024.

Pole 1024 exists in a normally open configuration and will close two signals a monitoring signal and receive signal from microcontroller 390 upon the triggering of relay 1067. This signal pair is contained in a twisted pair shielded wire with the shield connected to ground externally through microcontroller 390. Pole 1023 exists in a normally open configuration with the base of the pole connected to $+28V_{DC}$ 601 signal. The triggering of relay 1039 triggers closes pole 1034 connecting the $+28V_{DC}$ 601 signal to the power input leg of relay 1033. The falling edge relay 410 serves the benefit of triggering upon the removal of power. This is desirable in the present embodiment of ICV-Lite 210, because the launcher controller 380 removes power from the launching ordnance simulator prior to "launch" command.

Upon removal of external power, the launching ordnance simulator 390 must supplement with its own power. This process is facilitated effectively by the falling edge relay circuitry. The pinout for any falling edge relay 410 is subject to the manufacturer. The falling edge relay 410 exists in a normally open state and receives $+28V_{DC}$ 601 power on the power input and the base of the relay pole 1020. The return line for falling edge relay 410 connects to analog ground 608. The trigger leads on falling edge relay 410 normally set in an open configuration on pole 1021 and will prime themselves once connected. Only the return of these trigger leads to an open state will trigger the falling edge relay 410. DPDT coil relay 1064 (in parallel with diode D12 972) facilitates this process. An input signal 921 (sourced from microcontroller 390) passes through diode D11 971 before connecting to the power input leg of relay 1064.

Once triggered by signal 921, the diode 972 closes pole 1021 priming falling edge relay to trigger once signal 921 is cut off from diode 972. Once the falling edge relay 410 triggers $+28V_{DC}$ 601 exits on the output of falling edge relay 410. The $+28V_{DC}$ 601 power provided on the output of falling edge relay 410 triggers relay 1067. This process closes pole 1023 activating relay 1065.

Activating relay 1065 closes the two poles 1021 and 1022. Pole 1021 closes supplying $+28V_{DC}$ 601 power out to signal line 987 and is reflected through LED L2 952. Pole 1022 closes supplying $-28V_{DC}$ 602 power out to signal line 988 and is reflected through LED L1 951. Signal line 989 carries the motor ignition input signal to DPDT coil relay 1066 or diode D15 975. While normally closed, this triggers pole 1024 to open the attached circuit in the appropriate timing sequence expected by the ordnance microcontroller 390, which contains among return lines 984, a payload return line connects to ground 607.

Figure 11A:
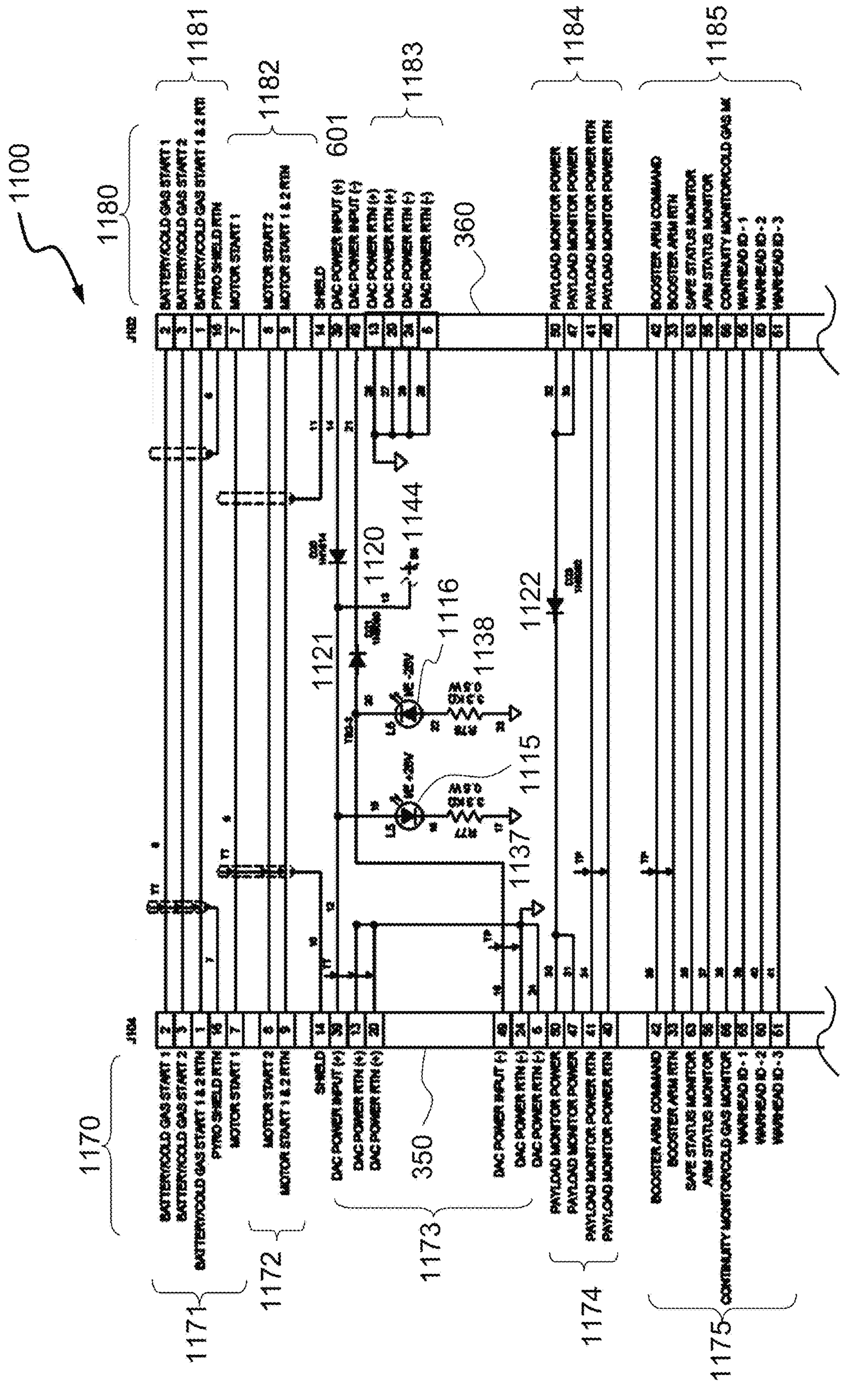
FIGS. 11A and 11B are schematic views of the data transfer circuitry.
Figure 11B:
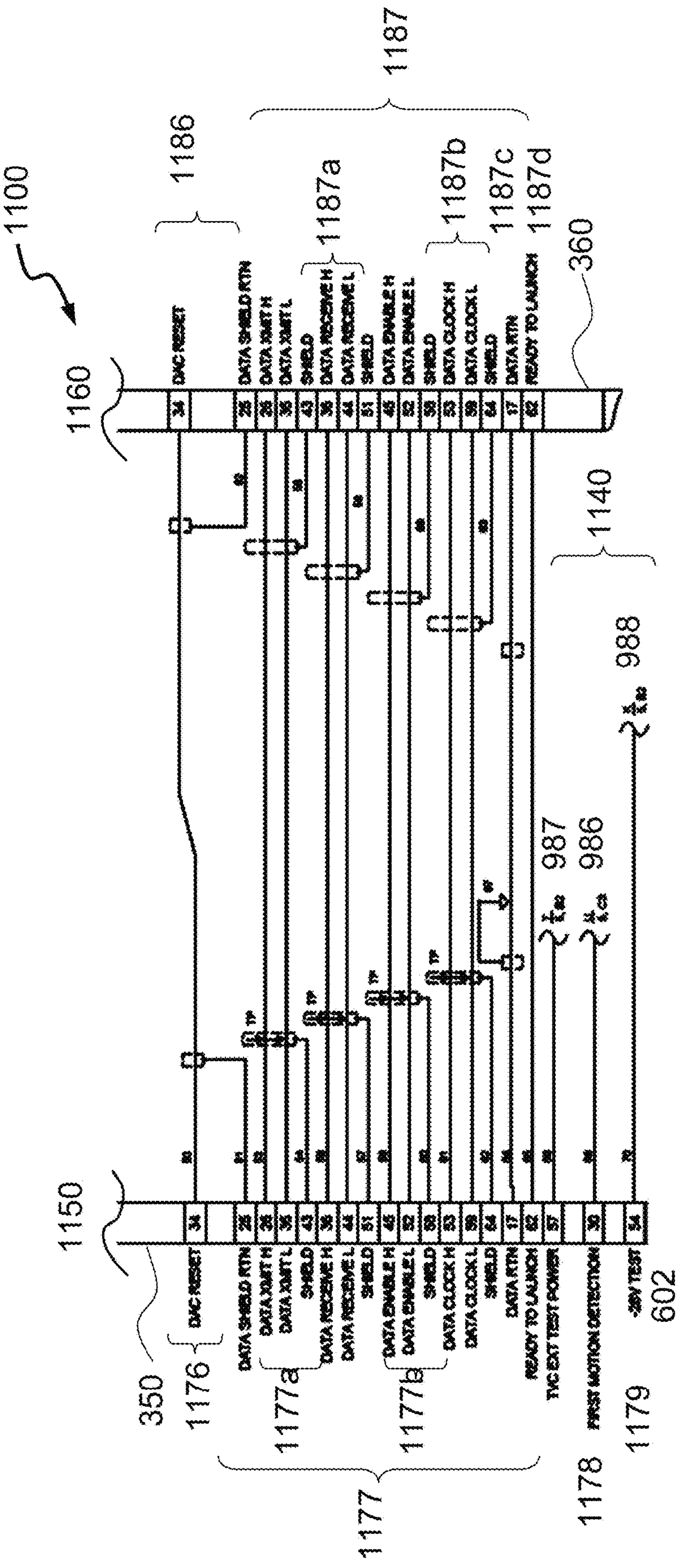

FIGS. 11A and 11B show schematic views 1100 of the data transfer circuitry. This circuitry receives inputs from the launcher control system 380 on connector 360. These input signals pass through this circuitry before entering the ordnance microcontroller 390 on connector 350. Some of the signals within this circuitry are utilized for user indications on the front plate 160 and hardware simulation in view 900. Components include LEDs 950 such as L5 1115 and L6 1116, diodes 960 such as diode D20 1120, diode D21 1121 and diode D22 1122; resistors 1040 such as 3.3 kΩ resistors R77 1137 and R78 1138. Select test parameters 1140 from connector 350 provide TVC extension power 987, motion detection 986 and $-28V_{DC}$ test 988.

The continuations of connectors 350 and 360 are provided between FIGS. 11A and 11B via respective break lines 1150 and 1160. Input signals 1170 from connector 350 include battery start 1171, motor start 1172, data acquisition power 1173, payload power 1174, booster and warhead monitor 1175, data acquisition reset 1176, data control 1177 including data transmit 1177*a* and data enable 1177*b*, motion detection 1178 and power test 1179. Input signals 1180 from connector 350 include battery start 1181, motor start 1182, data acquisition power 1183, payload power 1184, booster and warhead monitor 1185, data acquisition reset 1186, data control 1187 including receive 1187*a*, clock 1187*b*, data return 1187*c* and data 1187*d*. Battery 1181 and motor 1182 start signals pass directly between connectors 350 and 360 as a collection of three wires in a twisted shield configuration, where the shield references grounds on the external systems respectively. All LED circuitry contains an LED 960 connected to a power signal 601 and the ground leg connecting to a 3.3 kΩ resistor (R77 or R78) connected to analog ground 608.

Positive power input from launcher control system 380 passes through diode D20 1110 to control the power flow. The status among signals 1173 of this power input line reports out through LED L5 1115 and resistor R77 1137. The positive power input signal branches off power 921 for proper timing in the hardware simulation circuit as observed in view 900. The positive power input signal 601 is gathered with the positive power return lines as a group of three twisted wires. Pins 33 (booster arm return among signals 1175, 1185) 13 and 20 (both DAC power return among signals 1173, 1183) connect to positive power 601, whereas pins 49 (DAC power input), 24 (DAC power return both among signals 1173, 1183) and 9 (motor start return among signals 1172, 1182) connect to negative power 602. Negative power input 602 from launcher controller 380 passes through diode D21 1121 to control the power flow.

The status of this power input line reports out through LED L6 1116 and resistor R78 1138. The negative power input signal 602 is grouped with the negative power return line as a group of two twisted wires. External system return and power lines 1173 and 1183 connect to analog ground 608. Digital monitoring circuits from launcher control system 380 join together and pass through rectifier diode D22 1122 to smooth out the digital signal. After the data acquisition power input signal among signals 1173 is processed by LED L6 1116 and resistor R78 1138 passes through to ordnance microcontroller 390. Among payload digital return lines 1174 are two power monitor wires twisted around one another and passed between connectors.

A collection of direct signals pass directly between the launcher control system 380 and ordnance microcontroller 390 without modification, such as the reset line 1186 from the launcher control system 380 for the ordnance microcontroller 390 passes through. This reset line 1186 is secured from unexpected inductance with a single shielded wire. The shield connects to external system grounds respectively. Signals 1177*a*, 1187*a*, 1177*b* and 1187*b* are passed through in a twisted shielded wire configuration to inhibit noise. The shields are connected to external system grounds respectively. Data line 1187*d* passes directly through with no modification. Data return line 1187*c* passes though as a single shielded wire to prevent noise, with the shield connected to analog ground 608. Signals 987, 986 and 988 are all branched off directly from ordnance microcontroller 390 through connector 350 for use in hardware simulation circuitry as observed in view 900.

Figure 12:
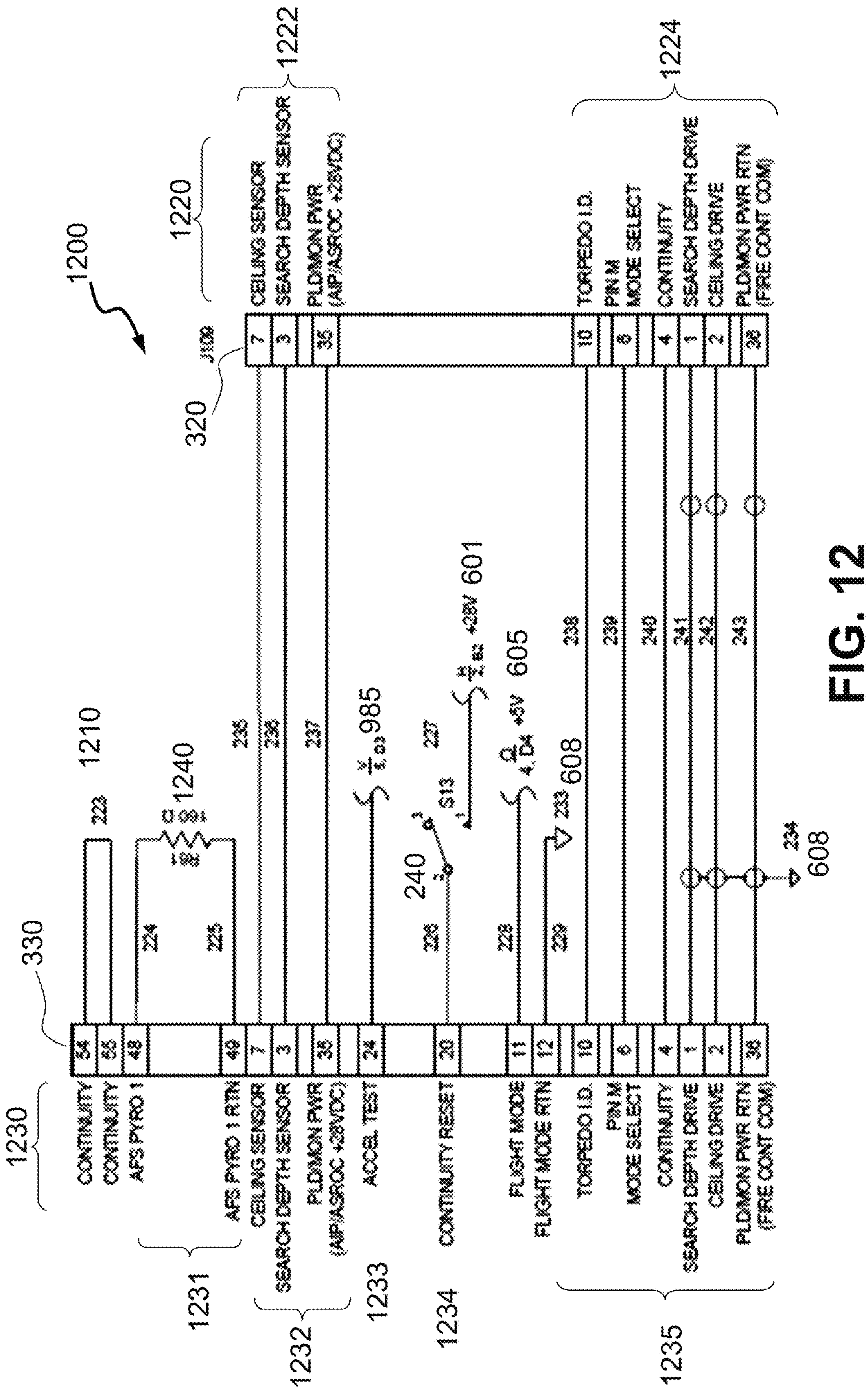
FIG. 12 is a schematic view of the payload circuitry.

FIG. 12 shows a schematic view 1200 of the payload transfer circuitry. This facilitates a connection to payload simulator 370 on connector 320 and serves to ensure proper simulation is observed by the receiving ordnance microcontroller 390 on connector 330. A hardwire circuit 1210 satisfies a continuity of signals expected by the ordnance microcontroller 390. Components include signals 1220 from connector 320, including sensor 1222 and select or search 1224, along with signals 1230 from connector 330, including pyrotechnic 1231, sensor 1232, acceleration 1233, continuity reset 1234 and search 1235. Flight mode signal on connector 330 connects either to +5$V_{DC}$ 605 and return to analog ground 608. Signals 1224 are received from payload simulator 370 on connector 320 and delivered to ordnance microcontroller 390 on connector 330. Pyrotechnic signal 1231 indicates effects of a hardware load provided by 160Ω resistor R61 1240. Signals 1232 and 1235 are passed directly from the payload simulator 370 to the microcontroller 390 without modification. Continuity reset signal line 1234 connects to power +28$V_{DC}$ 601 via the continuity switch 240.

Signal line 985 is broken out from the microcontroller 390 on connector 330 for the purpose of hardware simulation as observed in view 900. Momentary switch 240 exists in a nominally open condition, with the base of that pole connected to a relay within microcontroller 390 on community reset line 1234. When activated by an operator on the front panel 230, the switch connects +28$V_{DC}$ 601 to that relay line 1234, enabling the microcontroller 390 to be reset between operations. +5$V_{DC}$ 605 and analog ground 608 enable proper relay operation within microcontroller 390.

Figure 13:
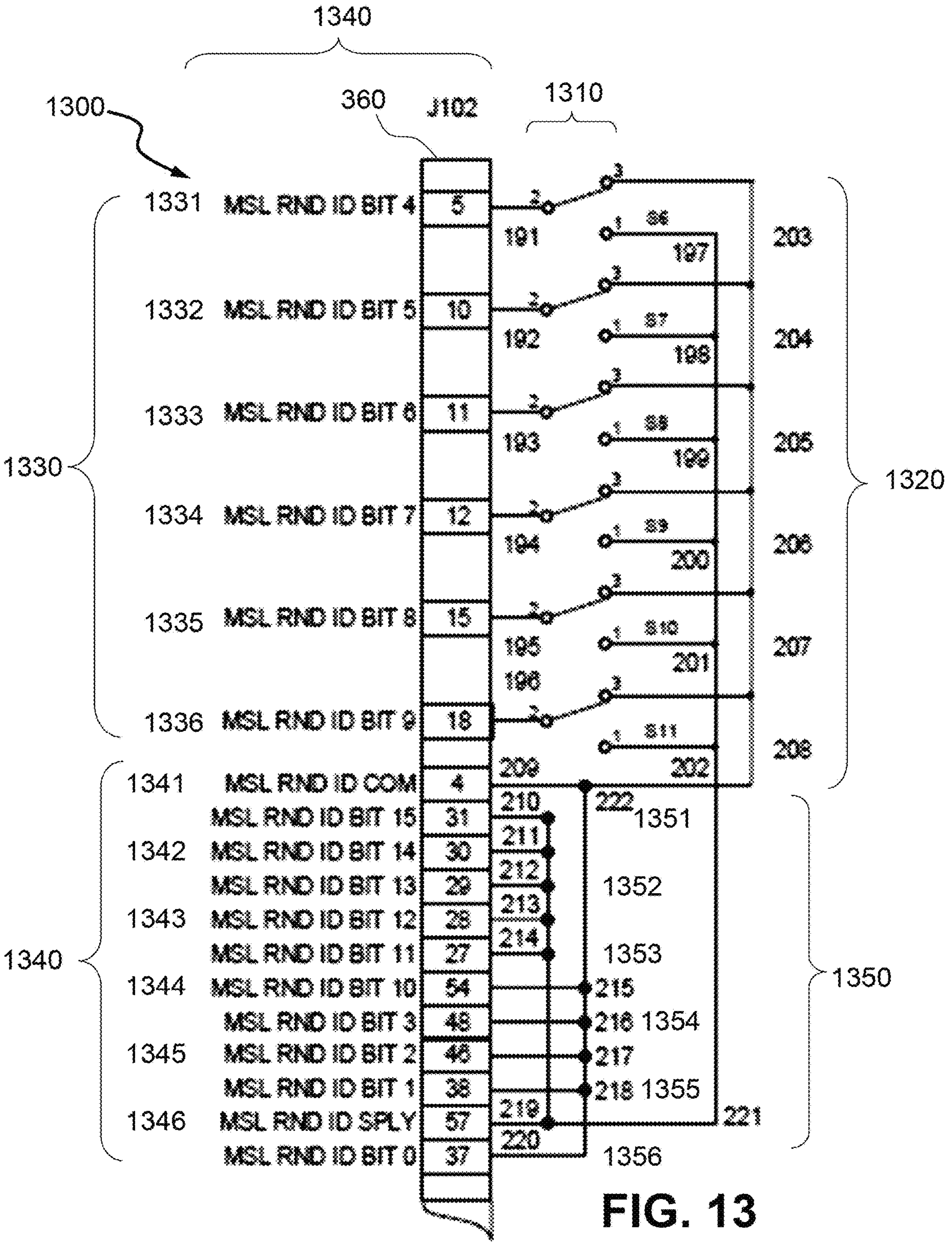
FIG. 13 is a schematic view of the identification bit circuitry.

FIG. 13 shows a schematic view 1300 of the identification bit circuitry. This circuitry exists for operator setting of switches 260 on front panel 230 to inform launcher control system 380 of the desired ordnance prior to a simulated launch. All setting configured here are reported out to launcher control system 380 through connector 360. The launcher control system 380 receives identification bits in the form of octal codes made up by bits four through eight in a binary "1" or "0" setting. A pre-programmed pattern of bits are identified by launcher control system (LCS) 380, and one of these patterns must be fulfilled for adequate recognition.

Components identified herein include switches or poles 1310 that connect a nodal array 1320 and to a first series of signal returns 1330. These returns correspond to bit 4 1331, bit 5 1332, bit 6 1333, bit 7 1334, bit 8 1335 and bit 9 1336. Additional components include a second series of signal returns 1340 including communication 1341 (pin 4), bit 14 1342 (pin 30), bit 12 1343 (pin 28), bit 10 1344 (pin 54), bit 2 1345 (pin 46) and supply 1346 (pin 57) coupled with a series of nodes 1350 including bit 15 1351 (pin 31), bit 13 1352 (pin 29), bit 11 1353 (pin 27), bit 3 1354 (pin 48), bit 1 1355 (pin 38) and bit 0 1356 (pin 37).

The bit pattern chosen must also reflect the type of system being simulated by payload simulator 370. All switches described for view 1300, identified by switch series 1310, are single pole dual position switches enabling the operator to set the switches as either a "1" or "0". The signal for bit 9 1336 provides a grounded or "0" signal. The signal for power bit 1346 provides a supply voltage or "1" signal. Identification bit 4 1331, bit 5 1332, bit 6 1333, bit 7 1334, and bit 8 1335 connects to the pole of one of the switches 1310. The two variable contact points on each switch 1310 provide one contact to signal 1342 for a "0" response and one contact to signal 1346 for a "1" response.

Other identification bits have a constant setting expected by the launcher control system 380. Signal bits 1336, 1344, 1354, 1345, and 1356 return a constant "0" value through a hardwired connection to signal 1341. Nodes 1351, 1342, 1352, 1343, 1353, and 1356 return a constant "1" value through a hardwired connection to bit 1346. This operation entails selection of contacts for test purposes. For VLA, this involves either a Mark-46 or Mark-54 as examples.

Figure 14:
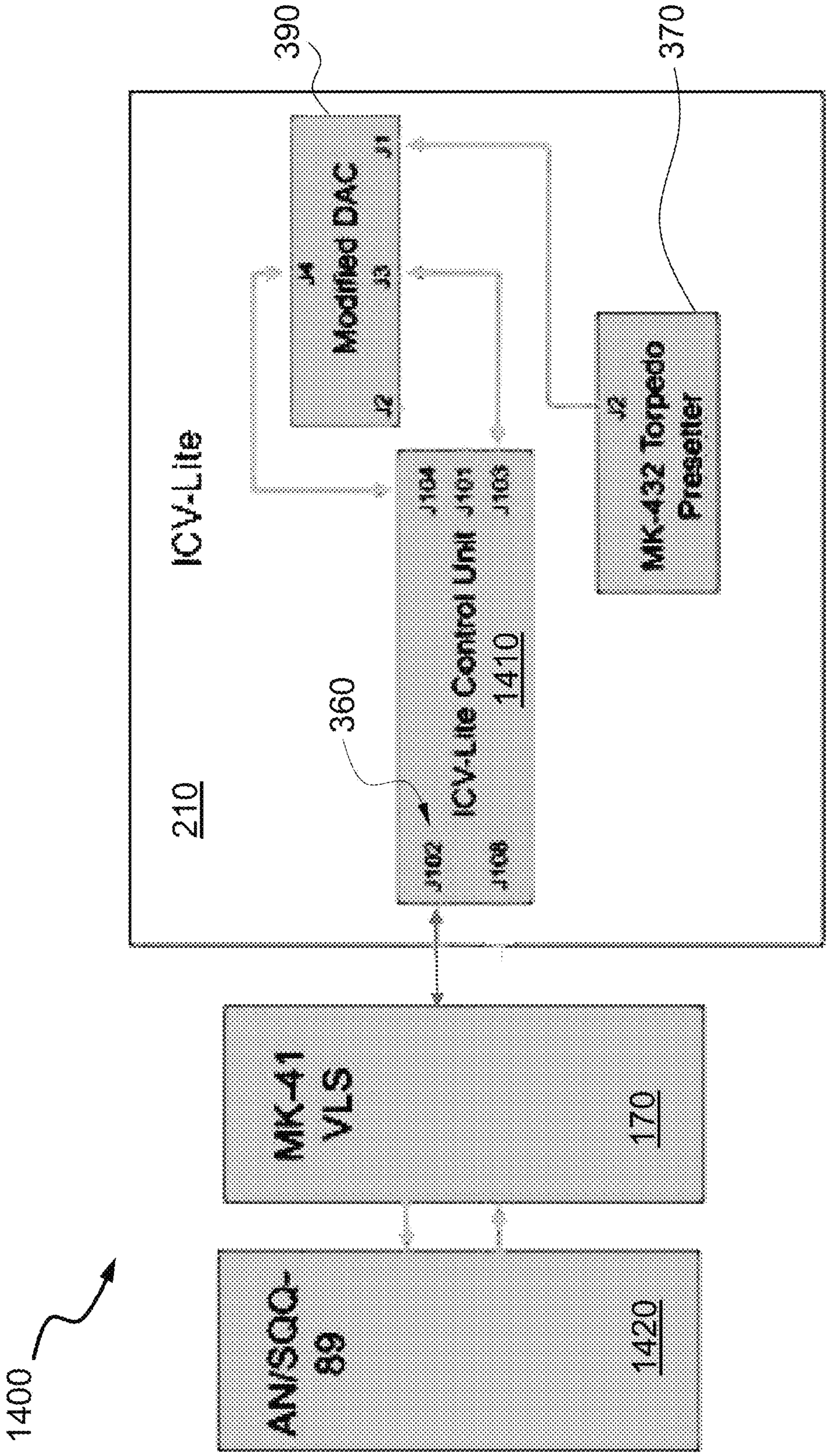
FIG. 14 is a block diagram view of the ICV-Lite and associated hardware.

FIG. 14 shows a block diagram view 1400 of the ICV-Lite 210 with missile equipment. The exemplary ICV-Lite 210 includes a control unit 1410, a modified digital autopilot control (DAC) as microcontroller 390 with four ports and a Mark-432 torpedo presetter as the simulator 370 with port J2. The control unit 1410 includes junctions J101, J102, J103, J104 and J105. The Mark-41 VLS 170 connects to junctions J102 and communicates with an AN/SQQ-89 1420 as an anti-submarine warfare (ASW) combat system. Junctions J104 and J103 respectively connect to ports J4 and J3 of the DAC 390. Port J1 of DAC 390 connects to port J2 of the torpedo presetter 370. The SQQ-89 1420 tracks underwater and surface contacts, and can engage them, as Aegis can engage aerial contacts through VLS 170.

Figure 15:
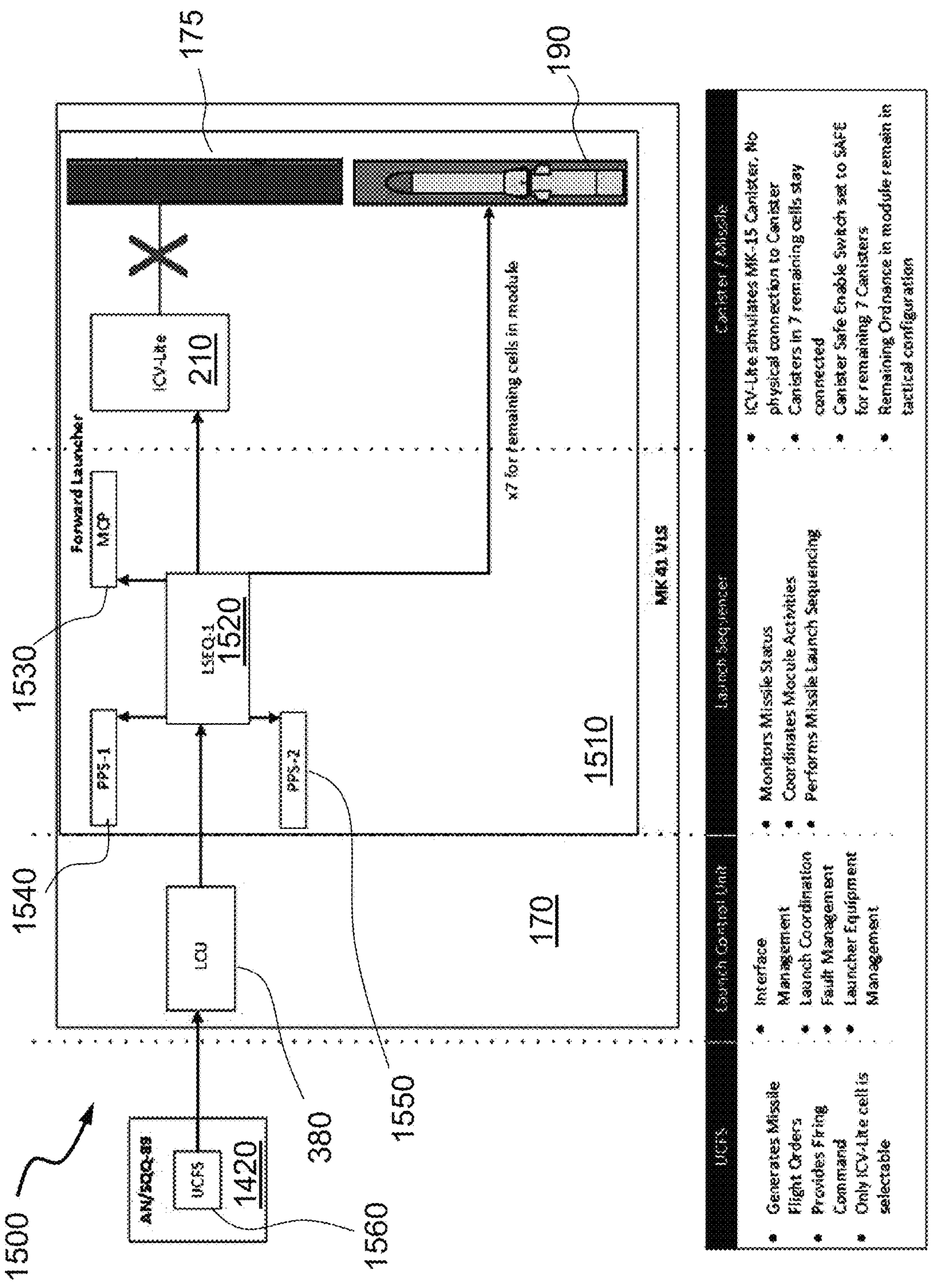
FIG. 15 is a block diagram view of a test configuration.

FIG. 15 shows a block diagram view 1500 of a VLS-ICV-Lite test architecture. The Mk-41 VLS 170 includes a forward launcher 1510 and the launch controller 380. The launcher 1510 includes a launch sequencer 1520 for communicating with a Tomahawk 190 (or other ordnance) and the ICV-Lite 210 that has interrupted connection with a canister 175. The sequencer 1520 also communicates with a mission controller 1530 and a pair of power systems 1540 and 1550. The launch controller 380 communicates with the SQQ-89 1420 via an Undersea warfare Control Functional Segment (UCFS) 1560.

The simulator device 210 also stimulates the VLS system 170 the same manner as a canister 175, so that the simulator resembles a weapon in a canister 175, constituting a safety measure. By not having a simulator inside of a real weapon canister inside VLS 170, one avoids potential mishaps. The exemplary simulator is disposed remotely from any live ordnance while in operation. The laboratory also used a Launcher Control Unit (LCU) 380, absent from the destroyer 110. Instead, when aboard the destroyer 110, the simulator device 210 connects directly into the Launch Sequencer (LSEQ) 1520. The purpose of the exemplary device 210 is to support shipboard testing of the VLS 170, but connection to auxiliary equipment in laboratory enables maintenance.

Figure 16:
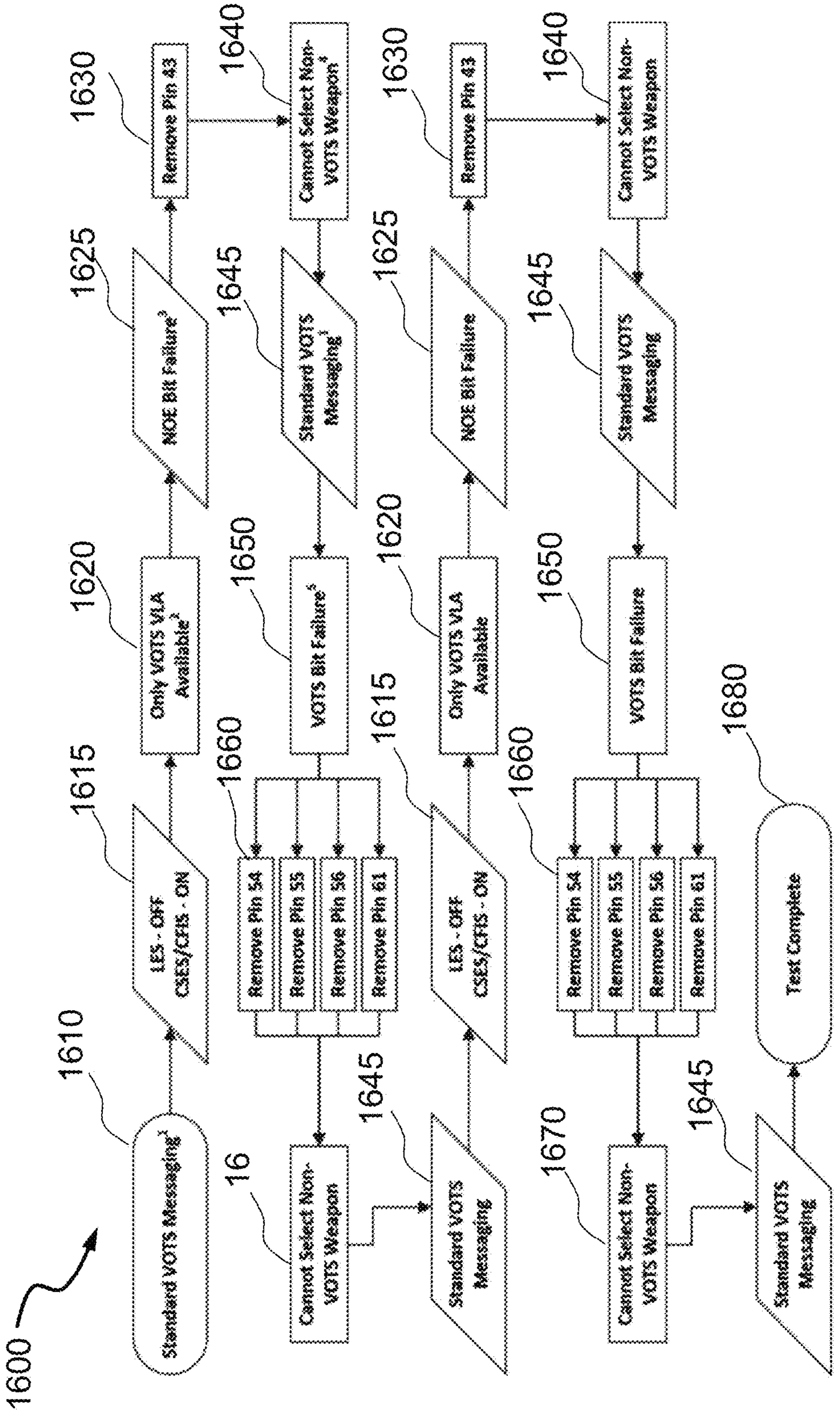
FIG. 16 is a logic flow diagram view of bit failure test.

In order to challenge safety features of the VLS 170 and the SQQ-89 1420, the process was tested to determine the result for extreme failure of bits representative of the VOTS or NOE signals using switches 260 and 1310. FIG. 16 shows a flow logic diagram view 1600 of ICV-Lite VLA Operational Test Set (VOTS) and Non-Ordinance Equipment (NOE) Bit Failure Test. The operation begins with standard VOTS messaging 1610, followed by setting LES to off and CSES/CFIS to "ON" 1615. This restricts only VOTS as available 1620 with an instruction NOE bit failure 1525. Pin #3 is removed 1630 resulting in inability to select non-VOTS weapon 1640. This is followed by interim standard VOTS messaging 1645 that initiates VOTS Bit Failure 1650. Consequently pins #1, #2, #3 and #4 are removed 1660 resulting in inability to detect Non-VOTS weapon 1670. Subsequently, messaging 1645, setting 1615, restricting 1620, bit failure 1025, pin #3 removal, inability 1640, messaging 1645, bit failure 1650, four-pin removal 1660, inability 1670 and messaging 1645 are sequentially repeated until test completion 1680. This process enables hardware checkout, with failure identification.

This specification establishes the performance, design, development and test requirements for the Inert Checkout Vertically Launched Anti-Submarine Rocket (ASROC) 180, hereinafter referred to as ICV-Lite 210. The exemplary ICV-Lite 210, as described in this specification, is intended to temporarily replace the use of actual the Vertical Launch ASROC (VLA) 180 due to the VLA Moratorium to certify the SQQ-89 1420 during Combat Systems Shipboard Qualification Trials (CSSQT) test events to verify and validate End-to-End functionality and weapons placement. The ICV-Lite control unit 1410 of the LCV-Lite 210 utilizes the VLA Operational Test Set (VOTS) response, which is pre-loaded onto all weapons control systems. This VOTS response triggers a safety feature rendering all cells in the launcher without a VOTS encoded message to be unavailable for selection. Although this configuration describes operational simulation of ASROC 180 in particular, other missile systems can be contemplated without departing from the scope of the invention.

Furthermore, while the VOTS encoded cells are selectable they may not proceed with launch orders while launch enable is present (Launch enable must be "NO" for the VOTS encoded missile to proceed with launch orders). An umbilical cable passes from the VLS 170 through the ICV-Lite primary control unit 1410 enabling necessary signals to be subdivided and specific weapon identification bits to be encoded using a MK-15 canister simulator, which also provides the hardwired VOTS encoded message. These signals pass on to the DAC 390 and MK-432 370 permitting communication with the ship's Undersea Warfare Control Functional Segment (UCFS) 1560 as console for status and response signal transfers prior to launch. Exemplary embodiments enable testing hardware and software sequence operations from the SQQ-89 1420 at the console UCFS console 1560 to the weapon itself, being the ICV-Lite 210 simulator. There is no other way to connect a weapon of this type to the SQQ-89 1420.

A cable connects the DAC 390 to the ICV-Lite control unit 1410 for breaking out response signals that enable the launch controller 380 to provide simulated VLA responses for Built-In-Test (BIT) and prelaunch interface verification. This is critical in explaining the purpose of the exemplary ICV-Lite 210. There are alternative techniques to check hardware, but there is no other manner to perform a prelaunch verification. This verification includes steps such as checking the health and battery life of the weapon, monitoring ship motion to ensure that a launch can be conducted safely, checking the position of the weapon (from the weapon's gyros) compared to the assessment of the UCFS 1560 for the weapon position. This is how one establishes whether a weapon could strike the intended target. The query of whether the flight path calculation actually matches between the weapon and the fire control system of the UCFS 1560 is determined by the exemplary technique. The launch controller 380 provides a satisfactory simulated response for the following VLA interfaces when prompted by the DAC 390: Thrust Cut Off (TCO), Thrust Vector Control (TVC), Arming-Firing Device (AFD), Thermal Battery, Airframe Separator, and continuity reset. Prior to launch, the UCFS 1560 calculates the flight path control parameters based upon desired water entry point.

The ICV-Lite 210 effectively simulates end-to-end VLA functionality from weapon identification through ready to launch while plugged in to the MK-41 VLS 170 launch sequencer. The operation of the ICV-Lite 210 is composed of sub functions described in the following paragraphs and accompanying illustrations. These include (1) Pre-Launch (VOTS), (2) Intent to Launch, (3) Launch, and (4) Water Entry.

Prelaunch (VOTS): Given the inputs to fire the VLA missile, the UCFS 1560 selects the VOTS encoded VLA cell 175 in the VLS 170, applies payload monitor power, and checks for missile restraint safe status. If these checks verify a safe condition, then the VLS 170 applies external power to the DAC 390, commands a reset to the DAC 390, presets the VOTS encoded simulated MK-54 Torpedo (or alternate) in the ASROC 180, and commands a second reset signal resulting in a status test command to the DAC 390. The DAC 390 then returns status verification to the UCFS 1560 using the ICV-Lite control unit 1410 for simulated signal response. Upon command from the UCFS 1560, the DAC 390 conducts self-diagnostic and flight sensor operational tests while still under power supplied by the VLS 170. The launcher also conducts a series of launcher safety tests. The prelaunch phase completed with manual launch select.

Intent to Launch (ITL): When intent to launch executed from the UCFS 1560, the DAC 390 will shift to ICV-Lite control unit 1410 power, resets, and conducts a built-in-test (BIT). This BIT checks the TVC positioning function using the TVC simulator and verifies proper DAC function. During this period, the UCFS 1560 will perform the final safety checks, verify Launcher and Missile Ready, and stimulate the Arming-Firing Device (AFD). UCFS 1560 issues final data direction cosines to verify that the ready to launch (RTL) command is valid.

Launch: Upon receipt of launch order from UCFS 1560 the ICV-Lite 210 maintains current settings and DAC power supply enabling verification of the launcher interface including but not limited to hatch opening. Firing report generated by UCFS 1560 and flight data provided by VLS 170.

Water Entry: Data, gathered from firing reports and flight data, utilized to calculate water entry point for comparison with ground truth.

The ICV-Lite 210 shall utilize military approved materials, processes and parts to the maximum extent possible. The design and construction of the ICV-Lite 210 shall satisfy the requirements of MIL-T-28800 Class 3, and MIL-STD-454, except as amended herein. An excerpt from MIL-T-28800 describing Class 3 equipment lists:

The ICV-Lite 210 provides (1) MK-54/MK-46 VLA torpedo weapon identification with VOTS encoded messaging, (2) Simulation of TVC, (3) MK-15 canister encoding, (4) Simulation of tactical VLA Digital Autopilot Controller, (5) Transmission of $28V_{DC}$ for Inert Thermal Battery, (6) Simulation of Arming Firing Device (AFD). The ICV-Lite team shall furnish and maintain all necessary inspection and test equipment and facilities and provide personnel for performing all quality conformance tests prior to intended operation. The test equipment shall be adequate to permit performance of the required quality conformance tests for the ICV-Lite 210.

FIG. 17 shows a tabular view 1700 of the signal sequences in Table 1 1710 for VOTS payload MK-46 torpedo and Table 2 1720 for VOTS payload MK-54 torpedo. Both tables 1710 and 1720 show connector pins, signal function for corresponding identification (ID) bits and corresponding voltage levels for their associated signals.

The ICV-Lite 210 shall weigh less than 102 $lb_m$ pounds, without including any connecting external cables. The ICV-Lite 210 shall have maximum dimensions of 25.5"×10.84"×20.95", with a maximum linear size of about 58". The ICV-Lite 210 shall be able to simulate a MK-15 VLS canister 170 sufficient to convey a MK-46 Mod 5A (SW) and MK-54 VLA weapon payload. The ICV-Lite 210 shall utilize VLA Operational Test Set (VOTS) and Non-Ordinance Equipment (NOE) bits using canister encoding plug missile ID without operator upon umbilical cable connection to Launch Sequencer (LSEQ) 1520 in tabular view 1700.

The parameters for these signals are defined by government document 5262258 Rev G. ICV-Lite 210 shall simulate or verify VLA pre-launch checks conducted by the DAC 390 or VLS MK-41 LSEQ 1520 including thrust vector controller, airframe separator, thrust cutoff, arming firing device, continuity reset, and thermal battery supplemental power.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An electronic device (210) for simulating launch activation of a missile having a rocket motor and a payload, said device connecting to a launch controller (380), and an ordnance controller (390), and comprising:

- a direct current (DC) power supply (220);
- a circuit board (440) having a voltage regulator (570, 580), a thrust vector control (TVC) circuit (510), an input plug (550), an output plug (560) and a power plug (590) that connects (710) to said power supply (220);
- a payload jack (340) that connects (720) said output plug (550) to the ordnance controller (390) and to said TVC circuit (510);
- an output data jack (350) that connects said circuit board (440) to the ordnance controller (390); and
- an input data jack (360) that connects said circuit board (440) to the launch controller (380), whereby said circuit board (440) receives a signal from the launch controller (380) to which said ordnance controller (390) responds.

2. The device according to claim 1, wherein said power supply (220) produces $+28V_{DC}$.

3. The device according to claim 2, wherein said voltage regulator (570) produces $\pm 15V_{DC}$.

4. The device according to claim 2, wherein said voltage regulator (580) produces $+5V_{DC}$.

5. The device according to claim 1, wherein said TVC circuit (510) connects to a falling edge time delay relay (410).

6. The device according to claim 1, wherein said TVC circuit (510) including an operational amplifier (810) and a dual-diode (820) that connect to said circuit board (440).

* * * * *